United States Patent
Yamaguchi et al.

(10) Patent No.: US 12,487,773 B2
(45) Date of Patent: Dec. 2, 2025

(54) MEMORY SYSTEM

(71) Applicant: Kioxia Corporation, Tokyo (JP)

(72) Inventors: Kensaku Yamaguchi, Kawasaki Kanagawa (JP); Kiyotaka Iwasaki, Yokohama Kanagawa (JP); Takashi Takemoto, Yokohama Kanagawa (JP); Kohei Oikawa, Kawasaki Kanagawa (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 18/460,284

(22) Filed: Sep. 1, 2023

(65) Prior Publication Data

US 2024/0094940 A1    Mar. 21, 2024

(30) Foreign Application Priority Data

Sep. 21, 2022 (JP) ................................ 2022-150539

(51) Int. Cl.
G06F 3/06        (2006.01)
(52) U.S. Cl.
CPC .......... *G06F 3/0655* (2013.01); *G06F 3/0608* (2013.01); *G06F 3/0679* (2013.01)
(58) Field of Classification Search
None
See application file for complete search history.

(56) References Cited

U.S. PATENT DOCUMENTS

| | | | |
|---|---|---|---|
| 8,464,074 B1* | 6/2013 | Parthasarathy | G06F 11/3082 370/386 |
| 9,026,754 B2* | 5/2015 | Matsushita | G06F 11/1458 711/162 |
| 9,696,910 B2 | 7/2017 | Manning et al. | |
| 10,430,376 B1* | 10/2019 | Armangau | G06F 16/1744 |
| 10,437,474 B1* | 10/2019 | Armangau | G06F 3/061 |
| 2009/0190760 A1* | 7/2009 | Bojinov | G06F 3/0676 380/269 |
| 2011/0252007 A1* | 10/2011 | Cho | G06F 3/0608 707/693 |
| 2011/0314235 A1 | 12/2011 | Kwon et al. | |
| 2013/0246732 A1* | 9/2013 | Seng | G06F 12/0246 711/E12.078 |

(Continued)

*Primary Examiner* — Yaima Rigol
*Assistant Examiner* — Elias Young Kim
(74) *Attorney, Agent, or Firm* — Kim & Stewart LLP

(57) ABSTRACT

A memory system includes a non-volatile memory and a controller. The controller is configured to perform a write operation of a first data cluster and a first partial overwrite operation of the first data cluster with first overwrite data. The write operation includes compressing and then encrypting the first data cluster, and writing the compressed and encrypted first data cluster into a first physical location of the non-volatile memory. The first partial overwrite operation includes encrypting the first overwrite data without performing compression, reading the compressed and encrypted first data cluster from the first physical location of the non-volatile memory, generating a first composite data cluster with the compressed and encrypted first data cluster read from the first physical location and the encrypted first overwrite data that is not compressed, and writing the first composite data cluster into a second physical location of the non-volatile memory.

19 Claims, 14 Drawing Sheets

(56) References Cited

U.S. PATENT DOCUMENTS

| | | | |
|---|---|---|---|
| 2014/0089566 A1* | 3/2014 | Wu | G06F 12/0246 |
| | | | 711/E12.008 |
| 2014/0245027 A1* | 8/2014 | Lee | G06F 21/74 |
| | | | 713/193 |
| 2016/0018993 A1 | 1/2016 | Manning et al. | |
| 2020/0387316 A1 | 12/2020 | Cheah et al. | |
| 2021/0263682 A1 | 8/2021 | Jeon et al. | |
| 2022/0342575 A1* | 10/2022 | Xiang | G06F 3/067 |
| 2023/0195389 A1* | 6/2023 | Gopalakrishnan | G06F 3/0679 |
| | | | 711/154 |

* cited by examiner

FIG. 6
| LOGICAL ADDRESS | PHYSICAL ADDRESS |
|---|---|
| 2000 | 400 |
| 2004 | 401 |
| 2008 | 402 |
| 2012 | 403 |
| ... | ... |
LUT
FIG. 7A
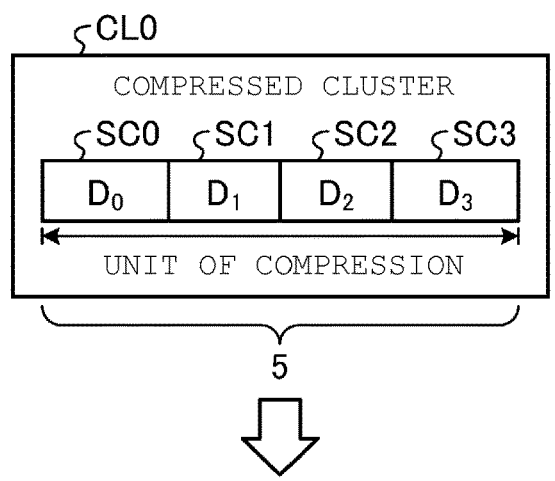
FIG. 7B
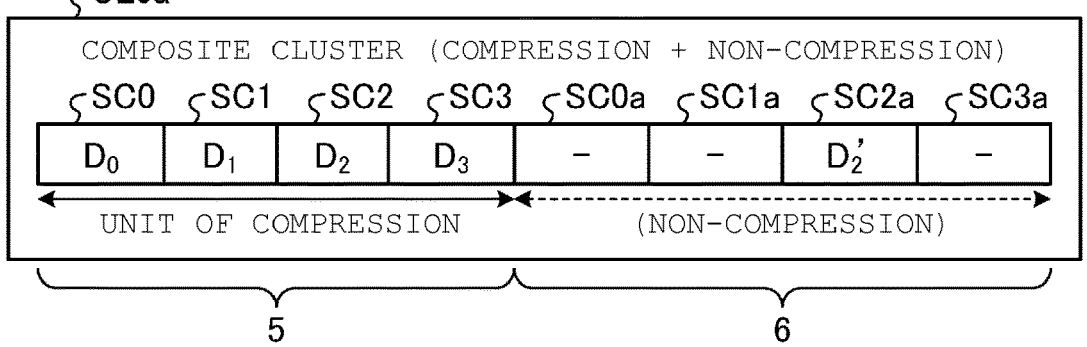

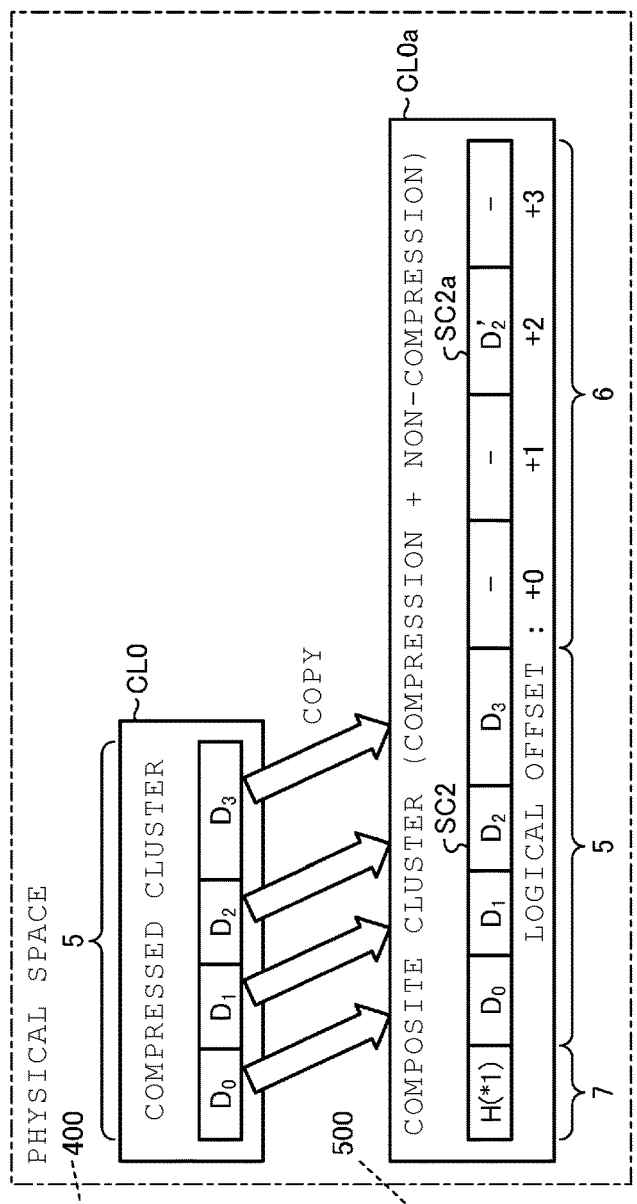

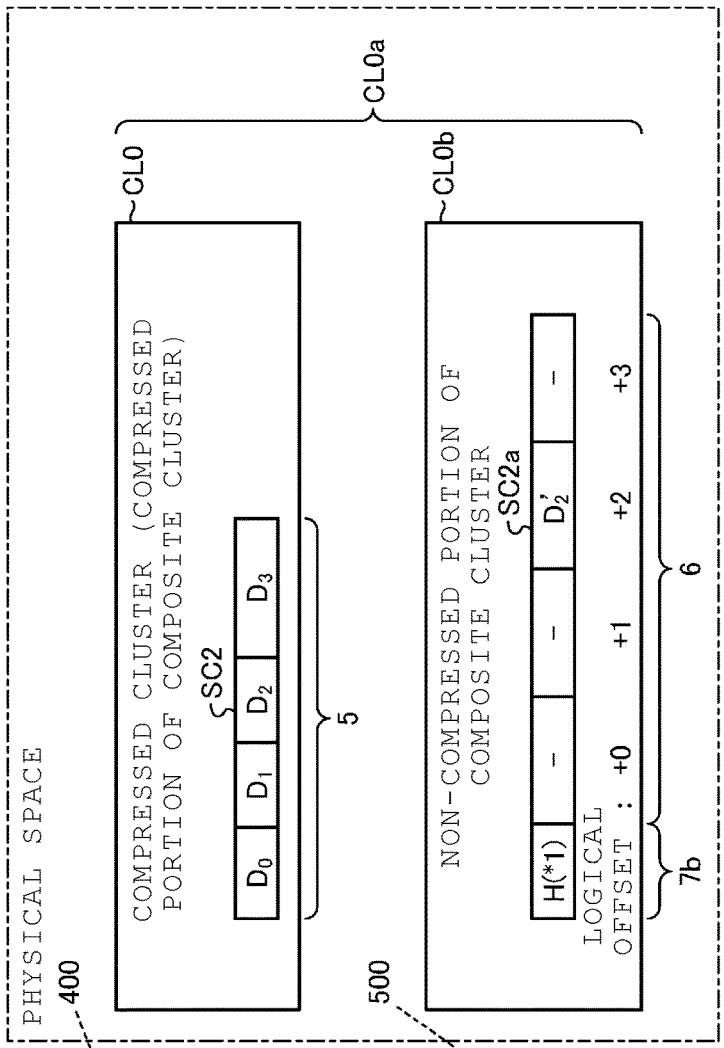

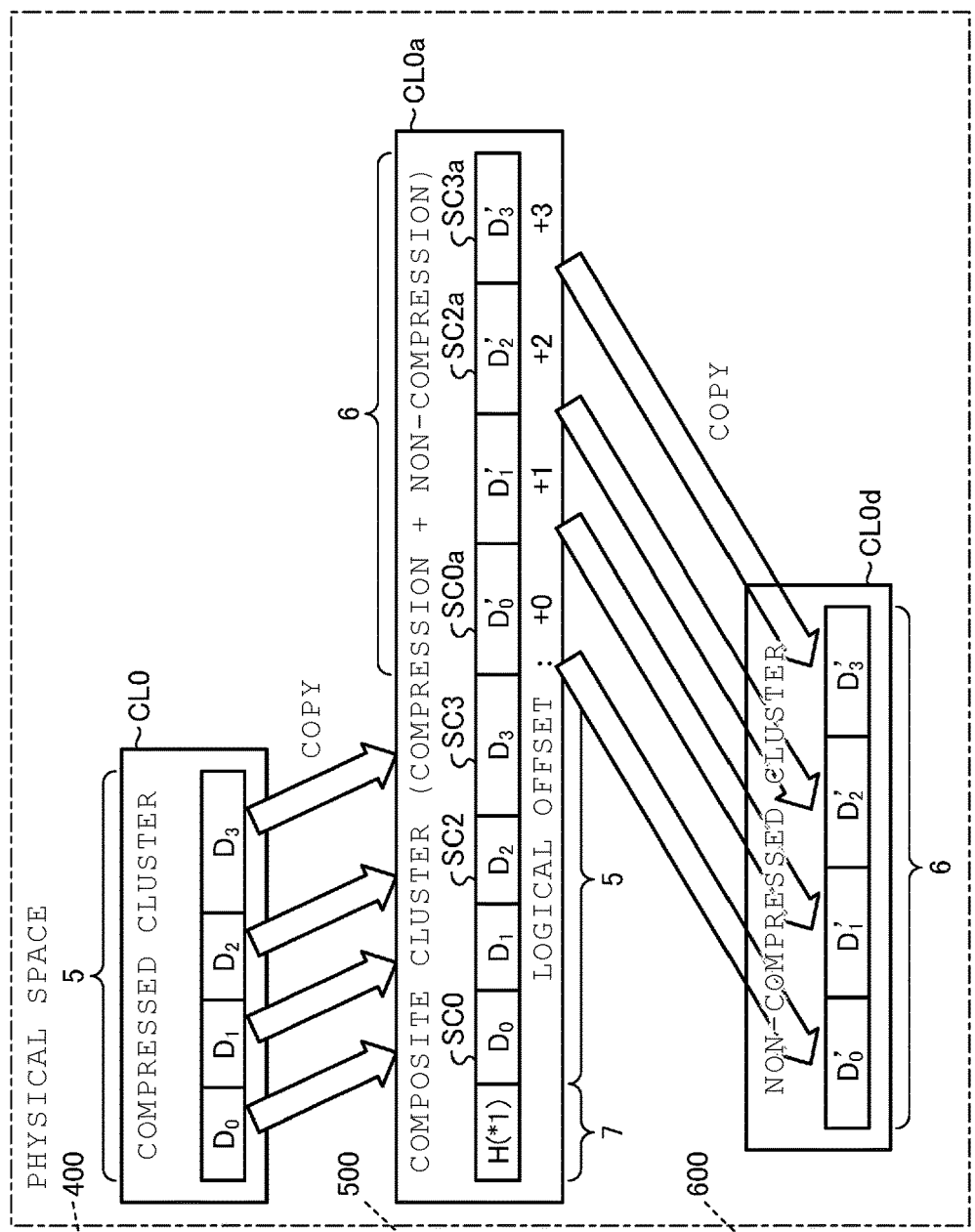

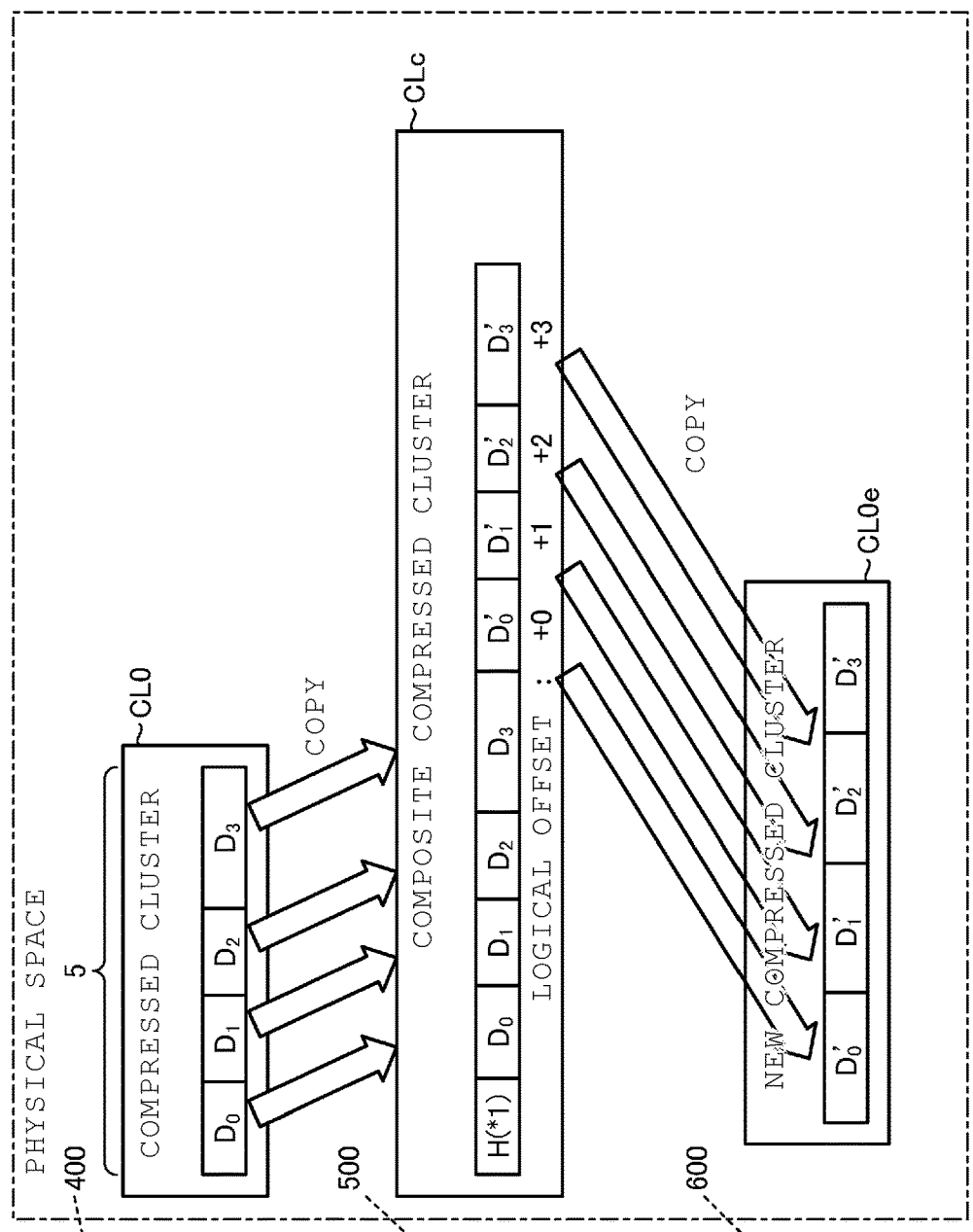

MEMORY SYSTEM

CROSS-REFERENCE TO RELATED APPLICATION

This application is based upon and claims the benefit of priority from Japanese Patent Application No. 2022-150539, filed Sep. 21, 2022, the entire contents of which are incorporated herein by reference.

FIELD

Embodiments described herein relate generally to a memory system.

BACKGROUND

In a memory system having a compression function, data can be compressed and the compressed data is written into a non-volatile memory. In the memory system, it may be required to partially overwrite the written data. At this time, it is desirable to efficiently perform partial overwriting of the written data.

BRIEF DESCRIPTION OF THE DRAWINGS

FIG. 6 is a diagram illustrating a configuration of address conversion information in the first embodiment.

FIGS. 7A and 7B are diagrams illustrating a composite cluster generation process in the first embodiment.

FIGS. 8A to 8C are diagrams illustrating operations related to the address conversion information and a physical space in the first embodiment.

FIGS. 9A to 9C are diagrams illustrating operations related to address conversion information and a physical space in a modification of the first embodiment.

FIGS. 13A to 13D are diagrams illustrating operations related to address conversion information and a physical space in the third embodiment.

FIGS. 15A to 15D are diagrams illustrating operations related to address conversion information and a physical space in the fourth embodiment.

DETAILED DESCRIPTION

Embodiments provide a memory system capable of efficiently performing partial overwriting of data.

In general, according to an embodiment, a memory system includes a non-volatile memory and a controller. The controller is configured to perform a write operation of a first data cluster and a first partial overwrite operation of the first data cluster with first overwrite data. The write operation include compressing and then encrypting the first data cluster, and writing the compressed and encrypted first data cluster into a first physical location of the non-volatile memory. The first partial overwrite operation includes encrypting the first overwrite data without performing compression, reading the compressed and encrypted first data cluster from the first physical location of the non-volatile memory, generating a first composite data cluster with the compressed and encrypted first data cluster read from the first physical location and the encrypted first overwrite data that is not compressed, and writing the first composite data cluster into a second physical location of the non-volatile memory.

Hereinafter, embodiments of the memory system will be described in detail with reference to the accompanying drawings. It is noted that the present disclosure is not limited by these embodiments.

First Embodiment

Figure 1:
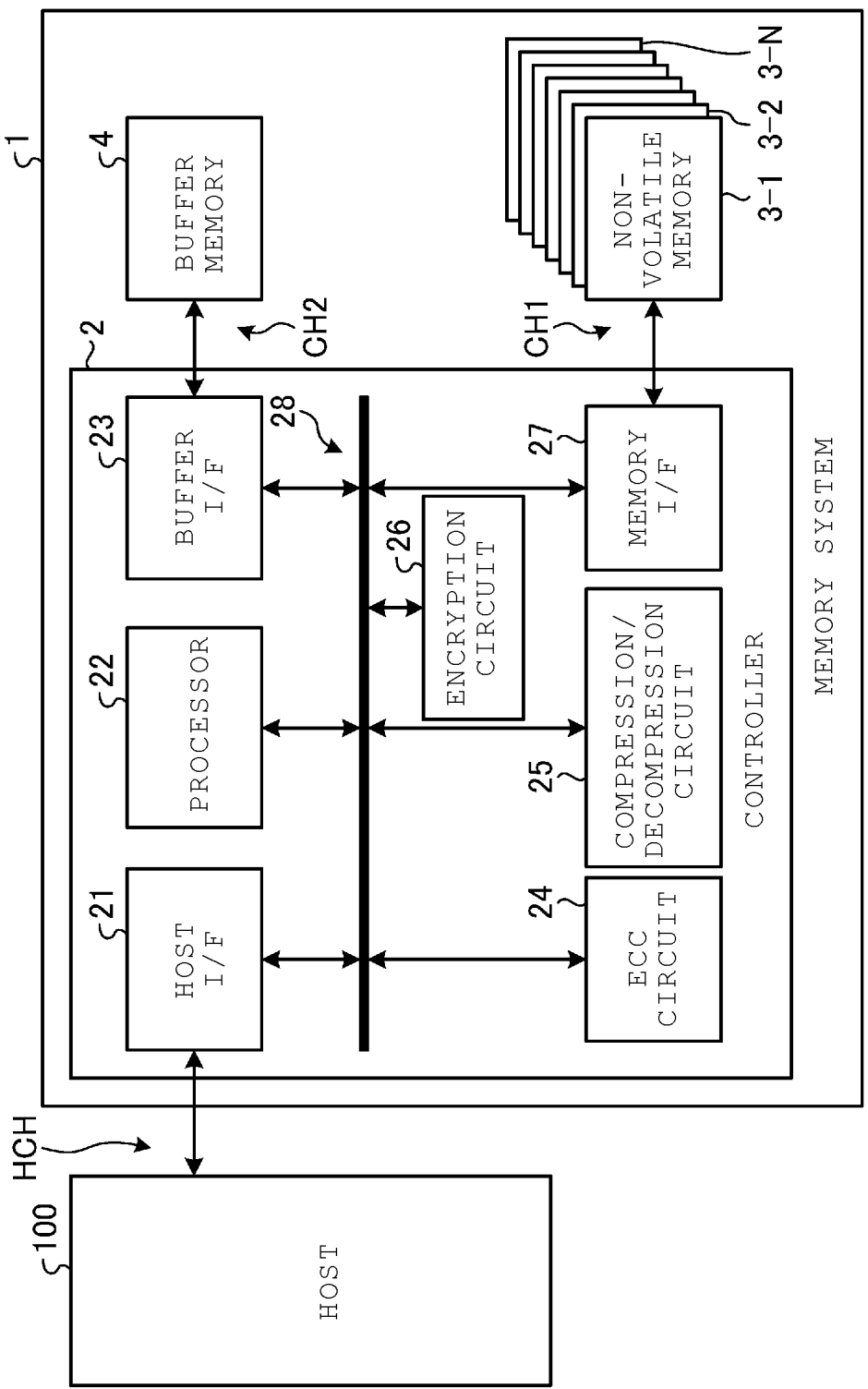
FIG. 1 is a block diagram illustrating a configuration of a memory system according to a first embodiment.

A memory system according to a first embodiment has a compression function and can compress data before writing the data into a non-volatile memory, and it is devised to efficiently perform partial overwriting of the written data with data having a size smaller than a unit of compression, which is a unit of data that is subject to compression. A memory system 1 is configured as illustrated in, for example, FIG. 1. FIG. 1 is a block diagram illustrating a configuration of the memory system 1.

The memory system 1 is communicably connected to a host 100 via a host channel HCH and can function as a storage medium for the host 100. For example, the memory system 1 is a solid state drive (SSD) or the like, the host 100 is a terminal such as a personal computer or a central processing unit (CPU), and the host channel HCH is a wired communication channel or the like.

The memory system 1 includes a controller 2, one or more non-volatile memories 3, and a buffer memory 4. The memory system 1 may have a plurality of non-volatile memories 3-1 to 3-N (N is any integer of 2 or more).

The controller 2 is connectable to the host 100 via the host channel HCH and can transmit and receive commands, data, and the like to and from the host 100. The controller 2 is connected to the plurality of non-volatile memories 3-1 to 3-N via a channel CH1, and commands, data, and the like can be transferred between the controller 2 and the non-volatile memory 3. The controller 2 is connected to the buffer memory 4 via a channel CH2 and can temporarily store data, management information, and the like in the buffer memory 4.

Each of the plurality of non-volatile memories 3-1 to 3-N can store data, management information, and the like in a non-volatile manner. In a storage area of the non-volatile memory 3, an area for storing data is sometimes referred to as a data storage area, and an area for storing management information and the like is sometimes referred to as a management information storage area.

Each non-volatile memory 3 may be, for example, a NAND flash memory, a resistance random access memory (ReRAM), a phase change RAM (PRAM), a magnetoresistive random access memory (MRAM), or a ferroelectric random access memory (FeRAM). In the following, description will be focused on a case where each non-volatile memory 3 is the NAND flash memory.

The buffer memory 4 can temporarily store data, management information, and the like. The buffer memory 4 is, for example, a volatile memory such as a dynamic random access memory (DRAM). The buffer memory 4 may be used as a working area by the controller 2. The buffer memory 4 temporarily stores data related to a write process and/or data related to a read process, temporarily stores data related to an internal process such as garbage collection (compaction), and temporarily stores management information such as address conversion information.

The controller 2 comprehensively controls each component of the memory system 1. The controller 2 may be implemented as a controller package including, for example, a system-on-a-chip (SoC). The controller 2 has an encryption function according to a security requirement and a compression function according to a requirement for an increase in a storage capacity.

The controller 2 includes a host interface (host I/F) 21, a processor 22, a buffer interface (buffer I/F) 23, an error correction code (ECC) circuit 24, a compression/decompression circuit 25, an encryption circuit 26, a memory interface (memory I/F) 27, and a bus 28.

The host interface 21, the processor 22, the buffer interface 23, the ECC circuit 24, the compression/decompression circuit 25, the encryption circuit 26, and the memory interface 27 are communicably connected via the bus 28.

The host interface 21 is connectable to the host 100 via the host channel HCH. The host interface 21 receives commands and data from the host 100, or transmits responses and data to the host 100.

The processor 22 comprehensively controls each component of the controller 2. The processor 22 may be implemented as the CPU or the like. The processor 22 controls the write process of writing data into the non-volatile memory 3 in response to a write command from the host 100 received by the host interface 21. The processor 22 controls the read process of reading data from the non-volatile memory 3 in response to a read command from the host 100 received by the host interface 21.

The buffer interface 23 performs an interface operation on the buffer memory 4 under the control of the processor 22. The data related to the write process and the read process, the data related to the internal process such as the garbage collection, the management information such as the address conversion information, and the like can be transferred between the buffer interface 23 and the buffer memory 4.

The ECC circuit 24 encodes and decodes data for error detection and error correction in read data. The ECC circuit 24 encodes data (write data) to be written into the non-volatile memory 3. In addition, the ECC circuit 24 also decodes data (read data) read from the non-volatile memory 3. The ECC circuit 24 performs the error detection and the error correction in the read data by decoding. The ECC circuit 24 notifies the processor 22 of the failure in the error correction when the error correction fails.

Any algorithm using a Reed-Solomon (RS) code, a Bose-Chaudhuri-Hocquenghem (BCH) code, a low-density parity check (LDPC) code, or the like can be applied to encoding and decoding algorithms by the ECC circuit 24.

The compression/decompression circuit 25 acquires the write data. The compression/decompression circuit 25 compresses the write data in a unit of a cluster described below to generate a compressed cluster. The compression/decompression circuit 25 performs a compression process on the cluster by using a lossless compression scheme. The compression/decompression circuit 25 outputs the compressed cluster. A cluster size is defined to be larger than a size of a logical block (sector), which is a minimum unit of access from the host 100 to the memory system 1.

The lossless compression scheme includes, for example, Lempel-Ziv (LZ77, LZ78, and the like), various other dictionary compression, encoding based on block sorting (for example, bzip2, and the like), various types of entropy encoding, or a combination of some of these.

It is noted that, in some cases, a compression ratio of the size of the compressed cluster after compression to the size of the original cluster (i.e., non-compressed cluster) may be less than a threshold value depending on the characteristics of the data of the original cluster and the compression scheme. That is, in some cases, a data size does not decrease even when the compression process is performed, or the data size increases. For this reason, when the compression ratio is less than the threshold value, the compression/decompression circuit 25 may output the original cluster (i.e., non-compressed cluster) instead of the compressed cluster. For the threshold value of the compression ratio, for example, the compression ratio at which the data size after the compression is the size obtained by subtracting the address granularity of a physical address from the data size of the original cluster may be set in advance. By doing so, it is possible to prevent the data size from being increased due to the compression.

The compression/decompression circuit 25 acquires the compressed cluster. The compression/decompression circuit 25 decompresses the compressed cluster to generate cluster data. The compression/decompression circuit 25 performs a decompression process in accordance with the lossless compression scheme. The compression/decompression circuit 25 notifies the processor 22 of the failure in decompression when the decompression fails.

In the encryption circuit 26, the security requirement for the self-encrypting drive is set in advance. The encryption circuit 26 encrypts the data to be written into the non-volatile memory 3 with an encryption key according to the security requirement. The encryption circuit 26 decrypts the encrypted data read from the non-volatile memory 3 with the same encryption key used for encryption according to the security requirement. The encryption circuit 26 notifies the processor 22 of the failure in decryption when the decryption of the encrypted data fails.

As the security requirement, a Security Subsystem Class (SSC) of the Trusted Computing Group (TCG) is taken as an example. The SSC of the TCG includes Opal, Enterprise, and others. The Opal SSC is intended mainly for an end user and includes a security specification designed for a personal computer. The Enterprise SSC is intended mainly for business and includes a security specification designed for a server. The security specification defines the encryption procedure.

For example, when the encryption is performed by the encryption circuit 26 according to a procedure defined in the security specification, it can be guaranteed that the security requirement is satisfied and the decryption can be performed by the encryption circuit 26. On the other hand, when the encryption is performed by the encryption circuit 26 according to a procedure different from procedures defined in the security specification, or when it can be regarded as such, there is a possibility that the security requirement may not be satisfied and the decryption by the encryption circuit 26 may fail.

The memory interface 27 performs an interface operation on the non-volatile memory 3 under the control of the processor 22. The data related to the write process and the read process (for example, compressed cluster and/or non-compressed cluster), the data related to the internal process such as the garbage collection, and the management information such as the address conversion information can be transferred between the memory interface 27 and the non-volatile memory 3.

Figure 2:
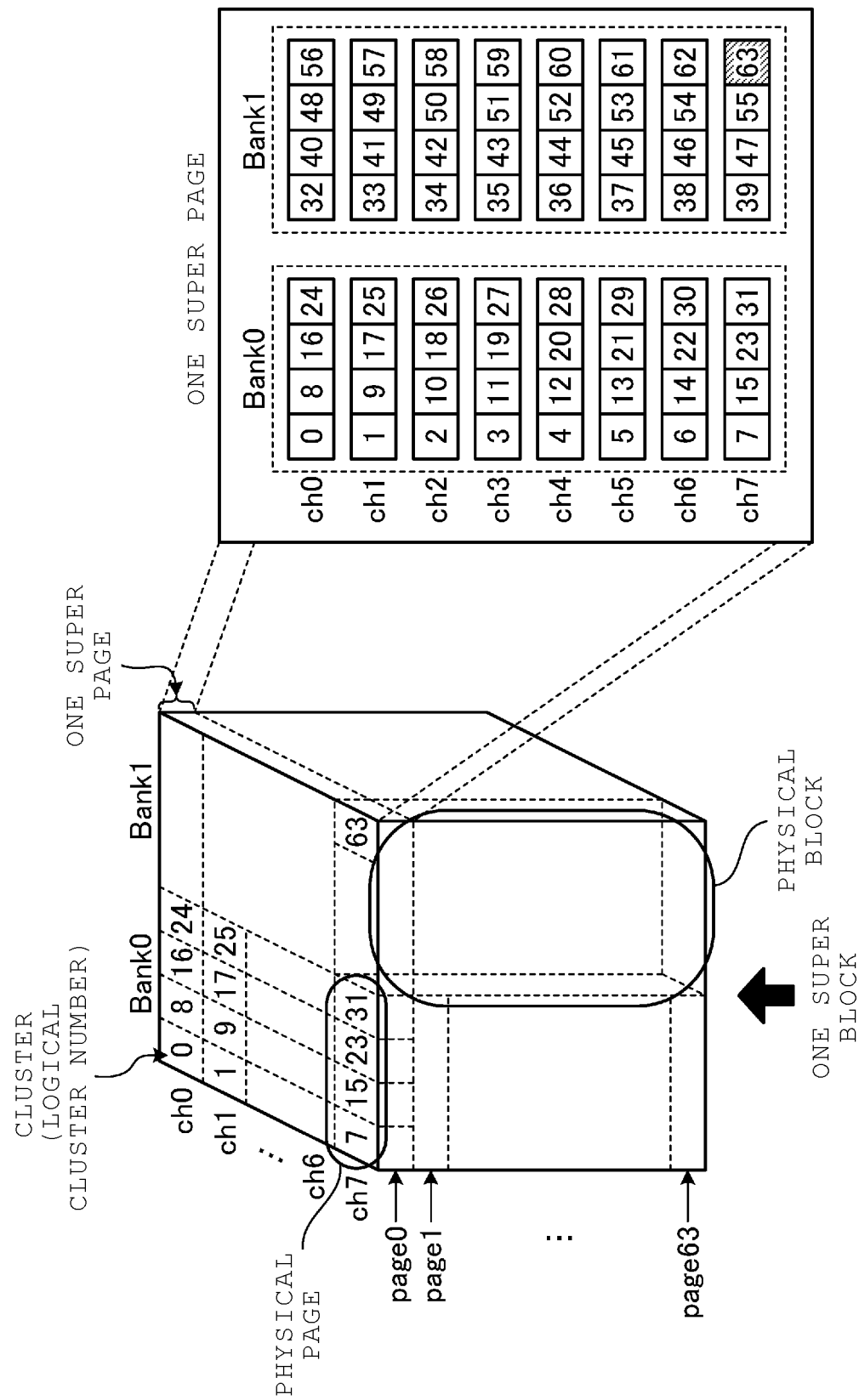
FIG. 2 is a diagram illustrating units of data management in the first embodiment.

Units of data management in the non-volatile memory 3 may be configured as illustrated in FIG. 2. FIG. 2 is a diagram illustrating the units of data management in the non-volatile memory 3.

The non-volatile memory 3 may include a plurality of memory chips. In each memory chip, a physical page is a unit in which data writing and data reading can be accessed at once. A physical block is configured with a plurality of the physical pages, and is a minimum unit of access in which data can be independently erased. Each physical block has a plurality of memory cells. Each memory cell can store multiple values (i.e., multiple bits of data). When each memory cell in a memory cell group connected to the same word line in each physical block can store n bits of information, the memory cell group is treated as n physical pages.

In addition, FIG. 2 illustrates a case where memory chips are connected to eight channels ch0 to ch7. The channels ch0 to ch7 are examples of the channel CH1 (refer to FIG. 1). The controller 2 can control each channel ch0 to ch7 in parallel with each other. In addition, the controller 2 can perform a plurality of parallel operations by bank interleaving on each of the channels ch0 to ch7. The controller 2 manages 16 physical pages that can be written/read almost at once in parallel as one super page that is a data storing area, and manages 16 physical blocks that can be erased in parallel as one super block that is a data block. The cluster stored in the non-volatile memory 3 is mapped with a physical address MCA (media cluster address). The physical address MCA is also referred to as a logical cluster address. The logical cluster address may include, for example, a logical cluster ID. The physical address MCA may include a super block address (MBA: media block address)+a super page address (MPA: media page address)+a cluster offset in a super page (MCO: media cluster offset).

In addition, data in the non-volatile memory 3 may be managed by the controller 2 in a unit of data management smaller than one physical page.

In the memory system 1, the controller 2 can compress and decompress user data. The user data that is to be written is grouped in the unit of compression on the buffer memory 4 and written into the non-volatile memory 3 after data compression. The user data is given in a unit of the logical block. The logical block in the present disclosure is a logical block designated by the host 100 and addressed by a logical address LBA (logical block address). In the following, the logical block designated by the host 100 is referred to as a sector.

For each sector, an LBA is designated as the sector's write destination. A size of the sector and a size of the unit of compression are not necessarily the same. In the following, an address space implemented by the LBA will be referred to as a logical space. In addition, the address space implemented by the physical addresses MCA is referred to as a physical space. The physical space corresponds to the data storage area in the non-volatile memory 3 in which the user data can be written.

When there is existing user data in the same LBA as an LBA of data to be written, the overwriting of the data is performed in the logical space. The overwriting of the data in the logical space is implemented by writing data to another address in the physical space. Due to the characteristics of the non-volatile memory 3, data cannot be overwritten to the physical address MCA in which data has been already written unless the written data is erased. For this reason, in the physical space, the compressed data after overwriting is written to the physical address MCA different from that of the compressed data before overwriting. Accordingly, the physical address MCA in the address conversion information indicating a corresponding relation between the LBA and the physical address MCA is changed to the physical address MCA after overwriting. The address conversion information stores the physical address MCA for each predetermined size of the LBA.

When a size of the cluster is larger than the size of the sector, that is, the unit of LBA, the data of the plurality of sectors are included in the cluster, and these sectors become consecutive LBAs. Since, in the address conversion information, only one physical address is usually stored for one cluster, writing to the sectors in the cluster is performed consecutively starting from one physical address. That is, the sectors in the cluster have consecutive LBAs and physical addresses. When overwriting all the sectors included in a certain cluster, a new cluster may be prepared and overwrite data may be stored, and there is no need to refer to the contents of the original cluster. It is noted that, in this specification, "the overwrite data" indicates data to be overwritten with respect to certain data.

However, some of the plurality of sectors provided in the cluster may be overwritten, and some may not be overwritten (hereinafter referred to as partial overwrite). In this case, the data of the non-overwritten sectors are copied from the original cluster to the new cluster to write the sectors in the cluster to consecutive physical addresses.

The encrypted data is not necessarily compressible. Therefore, in the memory system 1 that encrypts and stores data, the encryption is performed after the compression is performed. After that, the processor 22 controls the ECC circuit 24 to perform an error correction encoding process on the data encrypted by the encryption circuit 26. The ECC circuit 24 generates a parity for error correction (ECC parity) and generates a codeword having the generated ECC parity and the encrypted data. Then, the processor 22 is configured to write the codeword into the non-volatile memory 3 via the memory interface 27. That is, the processor 22 is configured to write the data based on the data encrypted by the encryption circuit 26 into the non-volatile memory 3 via the memory interface 27.

In addition, when receiving the read command, for example, from the host 100 via the memory interface 27, the processor 22 reads the data based on the read command from the non-volatile memory 3 via the memory interface 27. The processor 22 controls the ECC circuit 24 to perform an error correction decoding process on the read data. The read data on which the error correction decoding process has been performed is input to the encryption circuit 26 by the processor 22 as the encrypted data. The data decrypted by the encryption circuit 26 is input to the compression/decompression circuit 25 by the processor 22 as the compressed data. The compression/decompression circuit 25 decompresses the input compressed data. That is, the processor 22 decrypts and decompresses the data based on the data read from the non-volatile memory 3 in response to the read command from the host 100, and transmits the decompressed data to the host 100.

Figure 3:
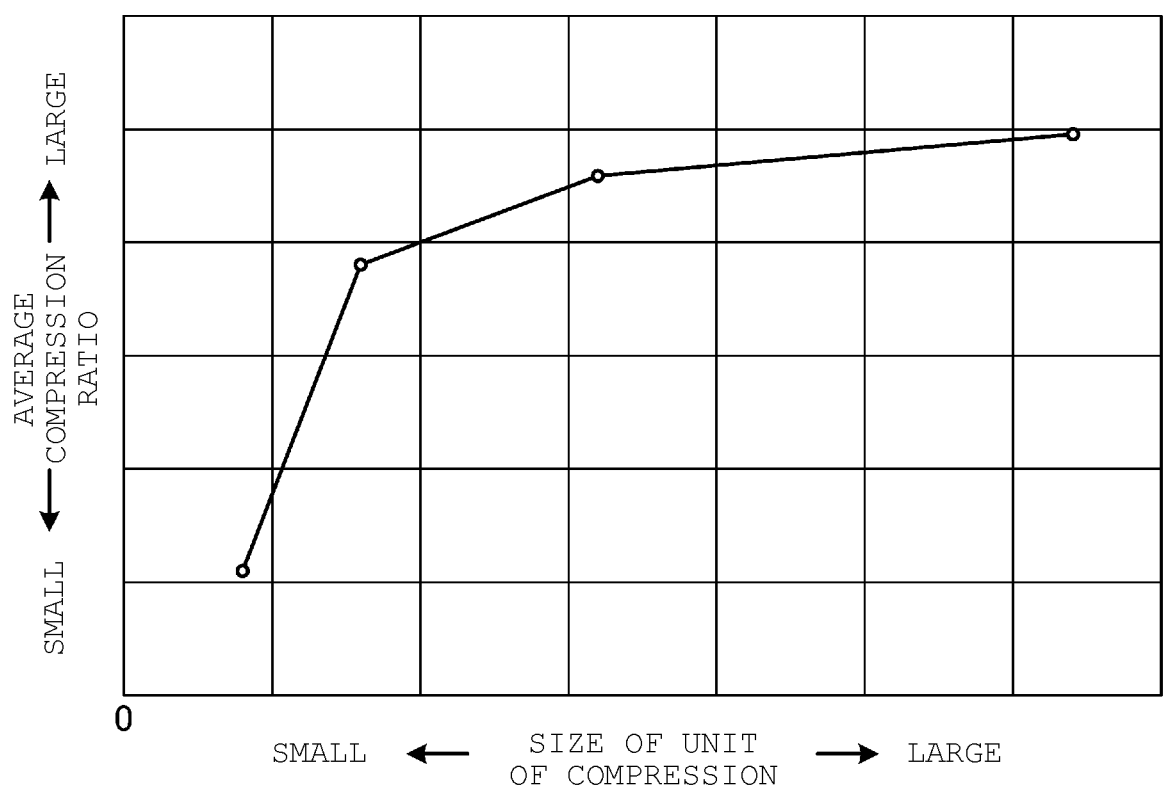
FIG. 3 is a diagram illustrating a relationship between a size in a unit of compression and an average compression ratio in the first embodiment.

FIG. 3 illustrates a relationship between a size in the unit of compression and an average compression ratio. The average compression ratio indicates an average compression ratio for a plurality of data patterns expected to be written with a relatively high frequency in the memory system 1. The compression ratio can be indicated by a ratio (compression ratio) of the data size after the compression to the data size before the compression. As illustrated in FIG. 3, there is a tendency that the larger the unit of compression, the higher the compression ratio. For this reason, in the present embodiment, a situation is assumed in which the unit of compression is the cluster size, the plurality of sectors are grouped in the unit of the cluster, data is compressed, and then encrypted and stored.

A case of the partial overwriting of the clusters in this situation is considered. In order to ensure the compression ratio to be sufficiently high, the plurality of sectors provided in the cluster may be collectively compressed and can be encrypted by using the encryption key after the compression. The plurality of sectors to be collectively compressed and encrypted are portions written before overwriting, and are referred to as original portions. The original portion is collectively compressed and encrypted. That is, since the unit of compression is the entire original portion, the compression ratio can be improved in comparison to the case where the sector is used as a unit of compression, and the data capacity that can be stored in the data storage area of the non-volatile memory 3 can be easily increased.

When overwriting a part of sectors of the original portion, the original portion may be decrypted and then decompressed. In order to decrypt the original portion, the same encryption key needs to be used as the encryption key that has been used to encrypt it. Assuming that the encryption key can be changed, the decryption is not always successful. In this case, the controller 2 cannot replace a part of sectors of the original portion. In addition, the memory system 1 returns a response to the write command to the host 100 depending on whether the write data is transferred to the non-volatile memory 3 and whether the write completion notification is transmitted from the non-volatile memory 3. In the partial overwriting, when decrypting and decompressing processes are performed, it takes extra processing time for decryption and decompression. Accordingly, there is a possibility that a latency of the command process of the partial overwriting of the compressed clusters is significantly increased in comparison to the command process of the non-compressed write data.

In security specifications for memory systems such as TCG Opal, the logical address range in which encryption can be performed and the logical address range in which decryption can be performed may be designated separately. For example, the encryption key may be changed after the original portion is encrypted. In other words, in some cases, the encryption key used for encryption of the overwritten portion and the encryption key used for decryption of the overwritten portion may be different from each other. Alternatively, there is a possibility that the logical address range of the overwritten portion deviates from the logical address range in which decryption can be performed. Due to these, decryption may fail. For example, it is considered that there is a possibility that the content different from the original content is decrypted (data is garbled), or that decryption fails (mismatch in a checksum or the like is detected). Alternatively (regardless of the encryption key), a situation is considered in which decryption is not permitted because it is not in the logical address range in which decryption can be performed. When the decryption fails, the above partial overwriting procedure cannot be performed properly. For this reason, the write failure response is returned to the write command.

In the present embodiment, in the case of performing partial overwriting, when the original portion is not decrypted, the compressed data of the original portion is stored as it is, and the overwritten portion is encrypted without compression and is concatenated with the data of the original portion to generate a composite cluster. As a result, it is possible to prevent the latency from being increased while satisfying the security specifications.

Figure 4:
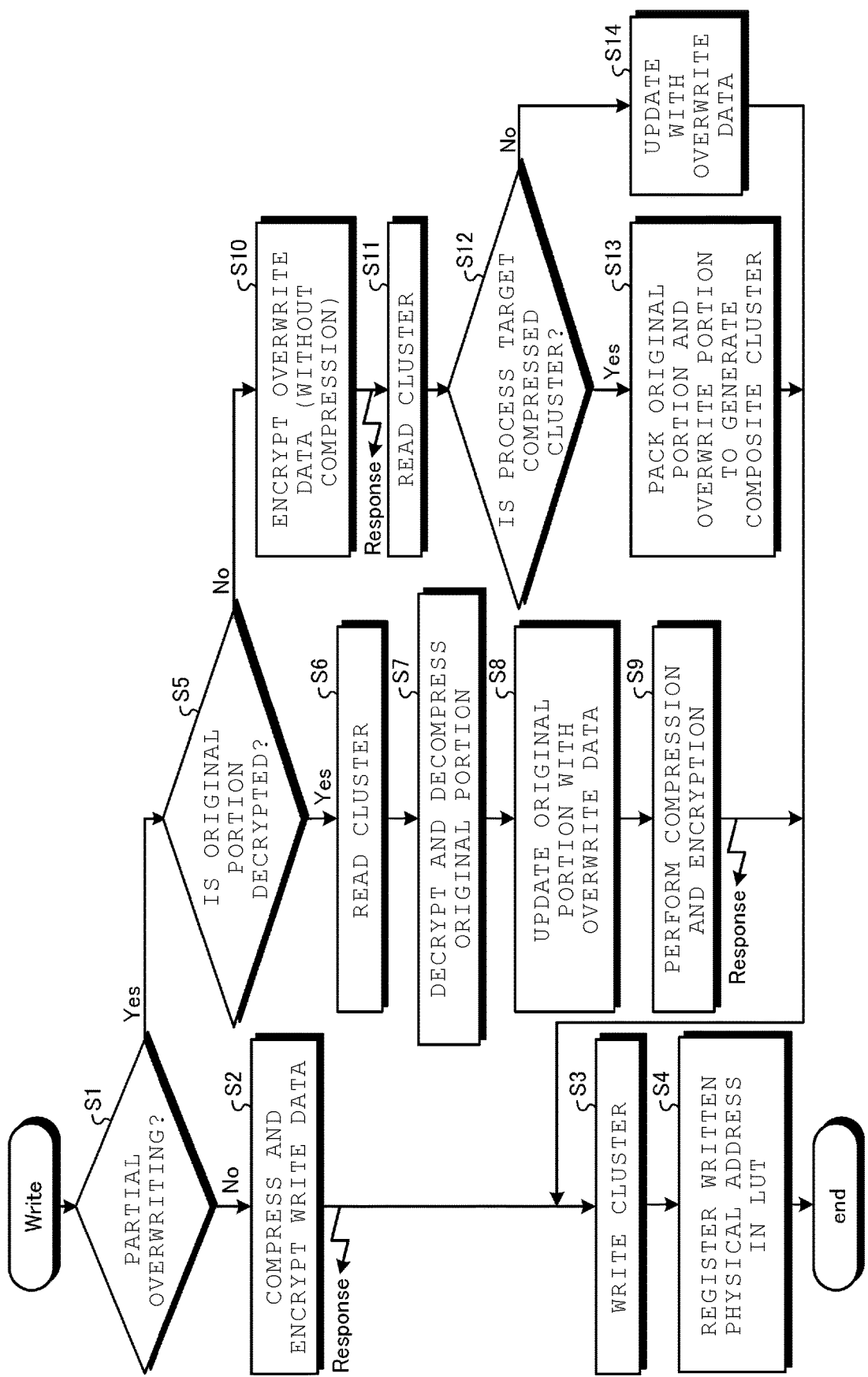
FIG. 4 is a flowchart illustrating a flow of a write operation in the first embodiment.

Next, the flow of the write operation will be described with reference to FIG. 4. FIG. 4 is a flowchart illustrating the flow of the write operation.

The controller 2 reads address conversion information LUT from the management information storage area of the non-volatile memory 3 and temporarily stores the address conversion information LUT in the buffer memory 4 when the memory system 1 is started.

When receiving the write command from the host 100, the controller 2 determines whether the write command gives an instruction for partial overwriting (S1).

Figure 5:
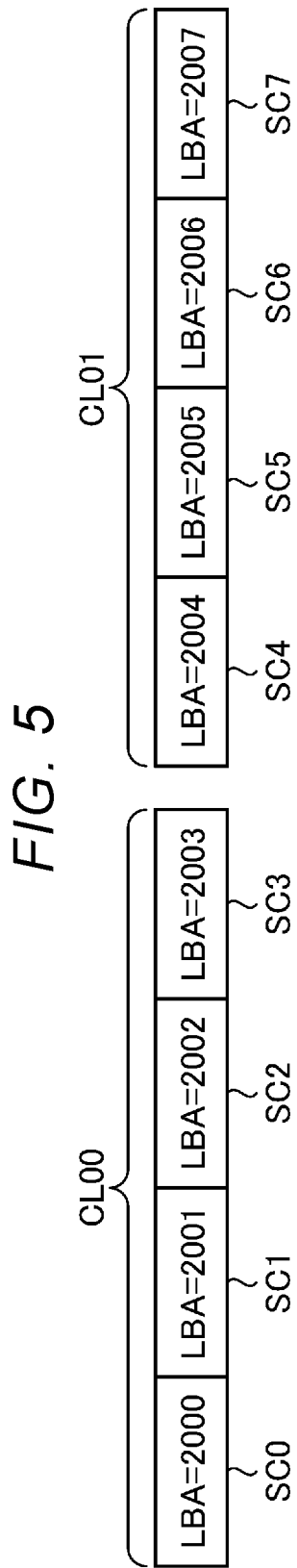
FIG. 5 is a diagram illustrating a configuration of each cluster in the first embodiment.

For example, the user data that is to be written is transferred from the host interface 21 into the controller and divided in the unit of the cluster according to the LBA. As illustrated in FIG. 5, in the memory system 1, each cluster CL may include the same number of the sectors SC. FIG. 5 is a diagram illustrating a configuration of each cluster CL, each cluster including four sectors. In FIG. 5, a cluster CL00 includes four sectors SC0 to SC3, and a cluster CL01 includes four sectors SC4 to SC7. The sectors SC0 to SC3 correspond to LBA=2000 to 2003, and the sectors SC4 to SC7 correspond to LBA=2004 to 2007.

In each cluster CL, the write command giving an instruction for writing with respect to the sector SC in the cluster CL is received. When all the sectors SC provided in the cluster CL are written with the write command and when no existing data is written in an LBA range of the cluster CL of the write command, the controller 2 determines that the writing is not partial overwriting of the cluster (No in S1). When existing data is written in the LBA range of the cluster CL of the write command, the controller 2 determines that the writing is the partial overwriting (Yes in S1).

For example, when the write command gives an instruction for writing with respect to a sector SC2 (LBA=2002) of the cluster CL00 as illustrated in FIG. 5, the controller 2 determines whether existing data is written in the LBA range 2000 to 2003 of the cluster CL00.

The controller 2 can determine whether existing data is written in an arbitrary LBA range with reference to the address conversion information LUT as illustrated in FIG. 6. FIG. 6 is a diagram illustrating a configuration of the address conversion information LUT. The address conversion information LUT includes the corresponding relation between the LBA and the physical address MCA for each cluster. FIG. 6 illustrates that data of LBA=2000 is written to the physical address MCA=400. LBA=2000 indicates the LBA of the leading sector SC of the cluster CL. Therefore, the controller 2 determines that existing data is written in the LBA range 2000 to 2003.

When existing data is written in the LBA range of the sector SC to which the write command gives an instruction for writing, the controller 2 determines that the writing is the partial overwriting of the cluster. When no existing data is written in the LBA range of the sector SC to which the write command gives an instruction for writing, the controller 2 determines that the writing is not the partial overwriting of the cluster.

When the cluster is not partially overwritten (No in S1), the controller 2 controls the compression/decompression circuit 25 to compress the data of the cluster CL when, for example, the plurality of sectors SC to be provided in the cluster CL are prepared and controls the encryption circuit 26 to encrypt the data of the cluster CL (S2). In the example of FIG. 5, the controller 2 compresses the data of the cluster CL00 by the compression/decompression circuit 25 and encrypts the data by the encryption circuit 26 when the sectors SC0 to SC3 provided in the cluster CL00 are prepared. Accordingly, the controller 2 generates a cluster CL0 (refer to FIG. 7A) in which the included sectors SC0 to SC3 are collectively compressed and encrypted. The cluster CL0 is a cluster of which its entirety is collectively compressed, and may be referred to as a compressed cluster. In the compressed cluster CL0, the group of the plurality of sectors SC0 to SC3 constitutes the original portion 5.

It is noted that, when the compression ratio in the case of compressing the cluster CL00 is less than the threshold value, the controller 2 encrypts the data of the cluster CL00 in the non-compressed state by the encryption circuit 26. Accordingly, the controller 2 generates a cluster CL0' in which the included sectors SC0 to SC3 are encrypted without compression. This cluster CL0' is entirely non-compressed and may be referred to as the non-compressed cluster.

In addition, in response to the security requirement, the controller 2 returns the write completion notification to the host 100 as a command completion response upon completion of encryption.

The controller 2 writes the compressed and encrypted cluster CL into the non-volatile memory 3 (S3). After completing the write, the controller 2 updates the address conversion information LUT in the buffer memory 4. That is, the controller 2 associates the physical address MCA of the written cluster CL with the LBA and registers the physical address MCA in the address conversion information LUT (S4).

When the instruction of the write command indicates partial overwriting of the cluster CL (Yes in S1), it is determined whether the data of the original portion 5 including the same LBA in the cluster CL is to be decrypted (S5). There are a case where decryption is impossible due to security specification requirements such as TCG Opal and a case where a command completion response does not need to be waited until decompression is completed because it is important to prevent the latency from being increased. In this case, the controller 2 determines not to decrypt the data of the original portion 5 (No in S5). Otherwise, the controller 2 determines to decrypt the data of the original portion 5 (Yes in S5).

With respect to the determination of whether to wait for the command completion response, when the command explicitly gives an instruction, the controller 2 follows the instruction. In addition, the controller 2 may make a determination based on the amount of data written by one command, the amount of other processing related to the writing being executed at the time of receiving the command, and the amount of data for each command.

When it is determined to decrypt the data of the original portion 5 (Yes in S5), the controller 2 reads the cluster CL from the non-volatile memory 3 (S6). The controller 2 temporarily stores the read cluster CL in the buffer memory 4. When the read cluster CL is the compressed cluster, the controller 2 decrypts and decompresses the cluster CL (S7). The controller 2 temporarily stores the decrypted and decompressed cluster data in the buffer memory 4. The controller 2 updates the cluster data with the overwrite data (S8). For example, when the write command gives an instruction for overwriting of the sector SC2, the controller 2 overwrites the data of the sector SC2 in the cluster CL0 on the buffer memory 4 with the overwrite data. Accordingly, the cluster CL is updated. The controller 2 compresses and encrypts the updated cluster CL (S9). Accordingly, the cluster CL0 (compressed cluster CL0) in which the included sectors SC0 to SC3 are collectively compressed is generated again. The controller 2 returns the command completion response to the host 100 upon completion of compression and encryption of the cluster CL.

After encrypting the updated cluster CL, the controller 2 writes the cluster CL into the non-volatile memory 3 in the same way as in the case of non-partial overwriting (S3). After the writing is completed, the controller 2 updates the address conversion information LUT. That is, the controller 2 associates the physical address MCA of the written cluster CL with the LBA and registers the physical address MCA in the address conversion information LUT (S4).

When determining not to decrypt the data on the original portion 5 (No in S5), first the controller 2 encrypts the overwrite data without compression (S10). The controller 2 temporarily stores the encrypted overwrite data in the buffer memory 4. The controller 2 returns the command completion response to the host 100 upon completion of encryption. In parallel with the encryption or after the encryption is completed, the controller 2 reads the data of the cluster CL (S11). The controller 2 temporarily stores the read data of the cluster CL in the buffer memory 4. The controller 2 determines whether the cluster CL that is a process target is the compressed cluster according to the read data (S12). When the cluster CL that is the process target is collectively compressed, the controller 2 determines that the cluster CL that is the process target is the compressed cluster (Yes in S12). When the cluster CL that is the process target is other than that, the controller 2 determines that the cluster CL that is the process target is not the compressed cluster (No in S12).

When the cluster that is the process target is the compressed cluster (Yes in S12), the controller 2 packs an original portion 5 and an overwritten portion 6 to generate a composite cluster CL0a (S13). The packing is grouping the plurality of data as one unit. The packing may be performed by adding the header 7 including information for grouping the original portion 5 and the overwritten portion 6 as one unit when the original portion 5 and the overwritten portion 6 are written in the physical space.

The controller 2 generates the composite cluster CL0a so that a sector SC2a of the overwritten portion 6 instead of the sector SC2, which is a part of the original portion 5, is associated with the LBA of the composite cluster CL0a. The header 7 added to the original portion 5 and the overwritten portion 6 may include information indicating that the sector SC2a instead of the sector SC2 is associated with the LBA.

The controller 2 may generate the composite cluster CL0a as illustrated in FIGS. 7A and 7B and FIGS. 8A to 8C. FIGS. 7A and 7B are diagrams illustrating an overview of a process for generating the composite cluster CL0a. FIGS. 8A to 8C are diagrams illustrating details of the process for generating the composite cluster CL0a.

FIG. 7A illustrates the compressed cluster CL0. The compressed cluster CL0 includes the original portion 5 of the compressed and encrypted cluster CL0 configured with four sectors SC0, SC1, SC2, and SC3. The four sectors SC0, SC1, SC2, and SC3 include data $D_0$, $D_1$, $D_2$, and $D_3$, respectively. FIG. 7B illustrates the composite cluster CL0a generated when the new data $D_2'$ is overwritten in the original portion 5 of the compressed cluster CL0 at the logical address of the sector SC2 having the data $D_2$.

The controller 2 can connect the encrypted non-compressed data (overwritten portion 6) to be overwritten to the contents (original portion 5) of the compressed cluster CL0 illustrated in FIG. 7A to generate the composite cluster CL0a illustrated in FIG. 7B. The composite cluster CL0a includes the original portion 5 and the overwritten portion 6. The original portion 5 is collectively compressed and encrypted as a whole. Unlike the original portion 5, the overwritten portion 6 is entirely encrypted without compression. The original portion 5 includes a plurality of the sectors SC0 to SC3. The overwritten portion 6 includes a plurality of sectors SC0a to SC3a. The plurality of sectors SC0a to SC3a correspond to the plurality of sectors SC0 to SC3.

In the composite cluster CL0a, by the partial overwriting, the valid sector is replaced, for example, from the sector SC2 to the sector SC2a. In this case, among the plurality of sectors SC0 to SC3, the sectors SC0, SC1, and SC3 include valid data, but the sector SC2 includes invalid data. The overwritten portion 6 includes the plurality of sectors SC0a to SC3a. Among the plurality of sectors SC0a to SC3a, the sectors SC0a, SC1a, and SC3a are invalid data, but the sector SC2a includes valid data.

For example, the controller 2 specifies the physical address MCA of the compressed cluster CL0 with reference to the address conversion information LUT on the buffer memory 4 as illustrated in FIG. 8A. In the case of FIG. 8A, the controller 2 specifies the physical address MCA=400 of the compressed cluster CL0. The controller 2 accesses the non-volatile memory 3, reads the data of the original portion 5 of the compressed cluster CL0 from the physical address MCA=400 of the non-volatile memory 3, and temporarily stores the data of the original portion 5 in the buffer memory 4. The controller 2 adds the header 7 to the leading portion of the original portion 5 and adds the overwritten portion 6 to the end of the original portion 5.

The header 7 includes information indicating that the original portion 5 and the overwritten portion 6 are packed. The header 7 includes the logical offset of each sector SC provided in the original portion 5 and the logical offset of each sector SC provided in the overwritten portion 6. The header 7 includes information indicating whether the data in each sector SC provided in the original portion 5 is valid or invalid, and the header 7 includes information indicating whether the data in each sector SC provided in the overwritten portion 6 is valid or invalid. Accordingly, the header 7 can indicate the logically overwritten sector SC in the cluster CL0. The header 7 may include bitmap information.

In the case of FIG. 8B, the header 7 may include the bitmap information "11010010". In the bitmap information "11010010", the first four bits correspond to the four sectors SC 0 to SC 3 of the original portion 5, and the latter four bits correspond to the four sectors SC0a to SC3a of the overwritten portion 6. The bitmap information "11010010" indicates that the original portion 5 and the overwritten portion 6 are packed with the number of bits.

The bitmap information "11010010" indicates the logical offset of each sector SC at that bit position. The logical offset indicates the offset from the logical address of the leading sector of the logical address. The first four bits indicate that the logical offsets of the sectors SC0, SC1, SC2, and SC3 in the original portion 5 are +0, +1, +2, and +3 at that bit position. With respect to the address conversion information LUT and the header 7, it is indicated that the logical addresses of the sectors SC0, SC1, SC2, and SC3 are 2000, 2001, 2002, and 2003. The latter four bits indicate that the logical offsets of the sectors SC0a, SC1a, SC2a, and SC3a in the overwritten portion 6 are +0, +1, +2, and +3. With respect to the address conversion information LUT and the header 7, it is indicated that the logical addresses of the sectors SC0a, SC1a, SC2a, and SC3a are 2000, 2001, 2002, and 2003.

The bitmap information "11010010" indicates whether the data is valid or invalid with that bit value. The first four bits "1101" indicate that the sectors SC0, SC1, and SC3 in the original portion 5 include valid data $D_0$, $D_1$, and $D_3$, but the sector SC2 is invalid data $D_2$. The latter four bits "0010" indicate that the sectors SC0a, SC1a, and SC3a in the overwritten portion 6 are invalid data, but the sector SC2a includes valid data $D_2'$.

After generating the composite cluster CL0a, the controller 2 writes the composite cluster CL0a into the non-volatile memory 3 (S3). In the case of FIG. 8B, the controller 2 writes the composite cluster CL0a to the physical address MCA=500. At this time, the header 7 is written to the physical address MCA=500 in the physical space (storage area of the non-volatile memory 3). The original portion 5 is copied to the physical location (for example, after the header 7) in accordance with the physical address MCA=500. The overwritten portion 6 is written at the physical location (for example, after the original portion 5) in accordance with the physical address MCA=500. After the writing is completed, the controller 2 updates the address conversion information LUT. That is, the controller 2 associates the physical address MCA of the written composite cluster CL0a with the LBA and registers the physical address MCA in the address conversion information LUT (S4). In the cases of FIGS. 8B and 8C, in the address conversion information LUT, the corresponding relation between LBA=2000 and the physical address MCA=400 is replaced by the corresponding relation between LBA=2000 and the physical address MCA=500 where a composite cluster CLa is written.

For example, after that, when the read command giving an instruction for reading of the sector SC2 with the LBA=2002 is received from the host 100, the controller 2 specifies that the logical address of the cluster CL including the sector SC2 is LBA=2000. The controller 2 accesses the physical address MCA=500 corresponding to LBA=2000 of the cluster including the sector SC2 with reference to the address conversion information LUT. The header 7 is stored at the physical address MCA=500, and according to the bitmap information "11010010" of the header 7, the controller 2 reads the data $D_2'$ of the sector SC2a instead of the sector SC2. Accordingly, the controller 2 can read the partially overwritten data $D_2'$.

Referring back to FIG. 4, when the cluster that is the process target is not the compressed cluster (No in S12), the controller 2 determines that the cluster that is the process target is already the composite cluster CL0a. In this case, the controller 2 updates the overwritten portion 6 out of the composite cluster CL0a with the overwrite data (S14).

For example, when being given an instruction for the overwriting of the sector SC0, the controller 2 specifies the physical address MCA of the composite cluster CL0a with reference to the address conversion information LUT illustrated in FIG. 8C on the buffer memory 4. In the case of FIG. 8C, the controller 2 specifies the physical address MCA=500 of the composite cluster CL0a. The controller 2 accesses the non-volatile memory 3, reads the data of the composite cluster CL0a from the physical address MCA=500 of the non-volatile memory 3, and temporarily stores the data of the composite cluster CL0a in the buffer memory 4. The controller 2 overwrites the overwrite data in the sector SC0a of the overwritten portion 6 on the buffer memory 4 and changes the information in the header 7 so that the sector SC0a instead of the sector SC0 becomes valid. The controller 2 may change the bitmap information in the header 7 from "11010010" to "01011010".

After updating the composite cluster CL0a, the controller 2 writes the composite cluster CL0a into the non-volatile memory 3 (S3). The controller 2 writes the composite cluster CL0a to the physical address MCA=600. At this time, although not illustrated, the header 7 is written to the physical address MCA=600. After the writing is completed, the controller 2 updates the address conversion information LUT. That is, the controller 2 associates the physical address MCA of the written composite cluster CL0a with the LBA and registers the physical address MCA in the address conversion information LUT (S4). The controller 2 replaces the physical address corresponding to LBA=2000 from MCA=500 to MCA=600.

Alternatively, when the cluster that is the process target is the non-compressed cluster CL (No in S12), the controller 2 updates the sector SC among the plurality of sectors SC provided in the non-compressed cluster with the overwrite data (S14).

For example, when being given an instruction for the overwriting of the sector SC2, the controller 2 specifies the physical address MCA of the non-compressed cluster CL with reference to the address conversion information LUT on the buffer memory 4. The controller 2 accesses the non-volatile memory 3, reads the data of the non-compressed cluster CL from the specified physical address MCA in the non-volatile memory 3, and temporarily stores the data of the non-compressed cluster CL in the buffer memory 4. The controller 2 overwrites the overwrite data in the sector SC2 of the non-compressed cluster CL on the buffer memory 4 to update the non-compressed cluster CL.

After updating the non-compressed cluster CL, the controller 2 writes the non-compressed cluster CL into the non-volatile memory 3 (S3). After the writing is completed, the controller 2 updates the address conversion information LUT. That is, the controller 2 associates the physical address MCA of the written non-compressed cluster CL with the LBA and registers the physical address MCA in the address conversion information LUT (S4).

In the write process illustrated in FIG. 4, when the data in the original portion 5 is not decrypted, the command completion response can be returned to the host 100 without waiting for the reading of the data in the original portion 5 or the decryption thereof. Accordingly, it is possible to prevent the latency due to the partial overwriting from being increased.

When reading the data of the composite cluster CLa written by the procedure illustrated in FIG. 4, the data of the original portion 5 is decrypted and decompressed. After that, for each LBA, in the LBA where data is stored in the overwritten portion 6, in other LBAs, the data of the original portion 5 that is decrypted and decompressed is used by decrypting non-compressed data in the overwritten portion 6. For example, when reading the composite cluster CLa illustrated in FIGS. 7A and 7B, non-compressed data $D_2'$ is decrypted and used with respect to the LBAs of the sector SC2 (data $D_2$) and the sector SC2a (data $D_2'$), and the data of the original portion 5 that is decrypted and decompressed is used with respect to the other LBAs. However, when all necessary LBA data is stored in the overwritten portion 6, the decryption and decompression of the data of the original portion 5 may be omitted.

As described above, in the present embodiment, the memory system 1 partially overwrites the collectively compressed and encrypted original portion 5. Accordingly, the data capacity of the data storage area can be easily increased. At this time, the controller 2 encrypts the overwritten portion 6 without compression while leaving the original portion 5 in the compressed state. Upon completion of encryption, the controller 2 returns the command completion response to the host 100. Along with that, the controller 2 packs the original portion 5 and the overwritten portion 6 and generates the composite cluster CL0a by associating the sector SC2a of the overwritten portion 6 instead of the sector SC2, which is a part of the original portion 5, with the LBA. Accordingly, the command completion response can be returned to the host 100 without waiting for the reading of the data in the original portion 5 and the decryption thereof. As a result, when the collectively compressed and encrypted original portion 5 is partially overwritten, it is possible to prevent the latency from being increased while satisfying security specifications.

It is noted that, as a first modification of the first embodiment, the packing (S13) of the original portion 5 and the overwritten portion 6 illustrated in FIG. 4 may be performed by adding a corresponding relation between the logical address and the overwritten physical address in address conversion information LUTa as illustrated in FIGS. 9A to 9C. FIGS. 9A to 9C are diagrams illustrating operations related to the address conversion information LUTa and the physical space (storage area of the non-volatile memory 3).

The controller 2 writes the compressed cluster CL0 into the non-volatile memory 3 and updates the address conversion information LUTa accordingly. As illustrated in FIG. 9A, in the address conversion information LUTa, the plurality of physical addresses may be associated with the logical address. The address conversion information LUTa is implemented, for example, in the table format and includes a first column in which the logical address is stored, a second column in which a first physical address is stored, and a third column in which a second physical address is stored. With respect to clusters that are not partially overwritten, the first and second columns are used. The third column may be blank (Null).

For example, the controller 2 writes the compressed cluster CL0 with the LBA=2000 to the physical address MCA=400 in the physical space as illustrated in FIG. 9B. Accordingly, the controller 2 registers the corresponding relation between LBA=2000 and the first physical address MCA=400 in the address conversion information LUTa.

After that, when receiving the write command giving an instruction for writing of the sector SC2, which is a part of the original portion 5, the controller 2 determines that the write command gives an instruction for the partial overwriting of the compressed cluster CL0 (original portion 5). The controller 2 encrypts the overwrite data without compression and temporarily stores the overwrite data in the buffer memory 4 in response to the write command giving an instruction for partial overwriting. At this time, the controller 2 does not read the compressed cluster CL0. The controller 2 configures the overwritten portion 6 with encrypted overwrite data (without compression) on the buffer memory 4 and adds a header 7b. Accordingly, the controller 2 configures a non-compressed portion CL0b of the composite cluster CLa.

The header 7b includes the logical offset of each sector SC provided in the overwritten portion 6. The header 7b includes information indicating whether the data of each sector SC provided in the overwritten portion 6 is valid or invalid. Accordingly, the header 7b can indicate the logically overwritten sector SC in the cluster CL0. The header 7b may include bitmap information.

In the case of FIG. 9B, the header 7b may include the bitmap information "0010". The bitmap information "0010" indicates the logical offset of each sector SC at that bit position. The logical offset indicates an offset from the logical address of the leading sector of the logical address. Four bits indicate that the logical offsets of the sectors SC0a, SC1a, SC2a, and SC3a in the overwritten portion 6 are +0, +1, +2, and +3. With respect to the address conversion information LUTa and the header 7b, it is indicated that the logical addresses of the sectors SC0a, SC1a, SC2a, and SC3a are 2000, 2001, 2002, and 2003.

The bitmap information "0010" indicates whether the data is valid or invalid with that bit value. The four bits "0010" indicate that the sectors SC0a, SC1a, and SC3a in the overwritten portion 6 are invalid data, but the sector SC2a includes valid data $D_2'$.

After generating the non-compressed portion CL0b, the controller 2 writes the non-compressed portion CL0b into the non-volatile memory 3. In the case of FIG. 9B, the controller 2 writes the header 7b and the overwritten portion 6 to the physical address MCA=500. At this time, the header 7b is written to the physical address MCA=500 in the physical space (storage area of the non-volatile memory 3). The overwritten portion 6 is written at the physical location (for example, after the header 7b) in accordance with the physical address MCA=500. After the writing is completed, the controller 2 updates the address conversion information LUTa. That is, the controller 2 associates the physical address MCA of the written non-compressed cluster CL0b with the LBA and additionally registers the physical address MCA in the address conversion information LUT. In the cases of FIGS. 9B and 9C, the controller 2 adds the second physical address MCA=500 to the third column corresponding to LBA=2000 in the address conversion information LUTa. Accordingly, in addition to the corresponding relation between LBA=2000 and the physical address MCA=400, the corresponding relation between LBA=2000 and the physical address MCA=500 where the header 7b and the overwritten portion 6 are written is registered in the address conversion information LUTa. Accordingly, the controller 2 generates the composite cluster CL0a. In the composite cluster CL0a, the original portion 5 of the compressed cluster CL0 and the overwritten portion 6 of the non-compressed part CL0b are packed. In the composite cluster CL0a, the sectors of the overwritten portion 6 instead of a part of the sectors of the original portion 5 are associated with the LBAs.

For example, after that, when the read command giving an instruction for reading of the sector SC2 of the LBA=2002 is received from the host 100, the controller 2 specifies that the logical address of the cluster CL including the sector SC2 is LBA=2000. The controller 2 accesses the first physical address MCA=400 and the second physical address MCA=500 corresponding to LBA=2000 of the cluster including the sector SC2 with reference to the address conversion information LUTa. The header 7b is stored at the physical address MCA=500, the controller 2 reads the data $D_2$ and $D_2'$ of the sectors SC2 and SC2a according to the bitmap information "0010" of the header 7b, and the data $D_2'$ of SC2a is valid data. Accordingly, the controller 2 can set the partially overwritten data $D_2'$ to be valid data.

Alternatively, when the controller 2 subsequently receives the read command giving an instruction for reading of the sector SC0 of the LBA=2000 from the host 100, the controller 2 specifies that the logical address of the cluster CL including the sector SC0 is LBA=2000. The controller 2 accesses the first physical address MCA=400 and the second physical address MCA=500 corresponding to LBA=2000 of the cluster including the sector SC0 with reference to the address conversion information LUTa. The header 7b is stored at the physical address MCA=500, the controller 2 reads the data $D_2$ and $D_2'$ of the sectors SC2 and SC2a according to the bitmap information "0010" of the header 7b, and the data $D_2'$ of the sector SC2a is valid data. Accordingly, the controller 2 can set the partially overwritten data $D_2'$ to be valid data.

In this manner, in the memory system 1, during the partial overwriting, the overwritten portion 6 is written into the non-volatile memory 3, and the physical address MCA of the overwritten portion 6 is additionally associated with the LBA. In this way as well, the original portion 5 and the overwritten portion 6 are packed, and the sectors of the overwritten portion 6 instead of a part of the sectors of the original portion 5 are associated with the LBAs to generate the composite cluster CL0a.

Second Embodiment

Next, a memory system 1 according to a second embodiment will be described. In the following, description will be focused on aspects that differ from those of the first embodiment.

In the second embodiment, when performing the partial overwriting, the compressed data of the original cluster that becomes the original portion 5 is stored as it is, and the overwritten portion 6 is encrypted by switching a unit of compression to a unit of a sector, and a composite cluster CLc is configured by connecting the data of the original portion 5.

Figure 10:
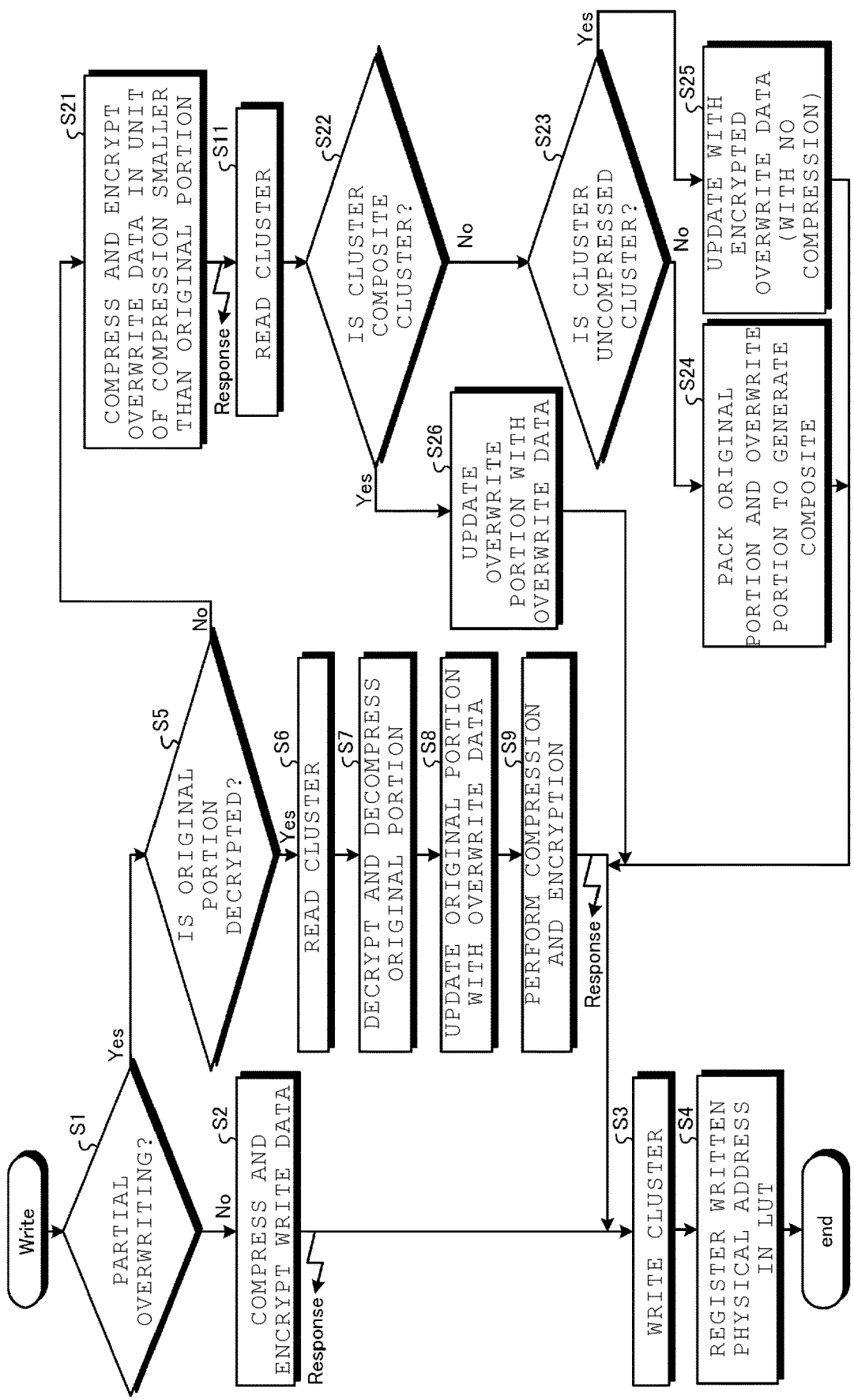
FIG. 10 is a flowchart illustrating operations of a memory system according to a second embodiment.

As illustrated in FIG. 10, in the second embodiment, the different write operation is performed in the following point. FIG. 10 is a flowchart illustrating a flow of the write operation. In the second embodiment, the data compression is also applied to the data in the overwritten portion of the composite cluster. The operations during writing that is not partial overwriting and during overwriting that decrypts the original portion are the same as in the first embodiment.

When the original portion 5 is not decrypted by partial overwriting (No in S5), the controller 2 compresses the overwrite data in a unit of compression smaller than that of the original portion 5 and then encrypts the overwrite data (S21). The unit of compression smaller than the original portion 5 may be a unit of minimum access (for example, a unit of a sector). The controller 2 reads the data of the cluster CL in parallel with the compression and encryption or after the compression and encryption are completed (S11). The controller 2 temporarily stores the read data of the cluster CL in the buffer memory 4. The controller 2 determines whether the cluster CL that is the process target is the composite cluster according to the read data (S22). When the cluster CL that is the process target includes the header 7, the original portion 5, and the overwritten portion 6, and the original portion 5 is collectively compressed, the controller 2 determines that the cluster CL that is the process target is the composite cluster CLc (S22 Yes). When the cluster CL that is the process target is other than that, the controller 2 determines that the cluster CL that is the process target is not the composite cluster CLc (No in S22).

When the cluster CL that is the process target is not the composite cluster CLc (No in S22), the controller 2 determines whether the cluster CL that is the process target is a non-compressed cluster (S23). When the cluster CL that is the process target includes the original portion 5 and does not include the overwritten portion 6 and the original portion 5 is non-compressed, the controller 2 determines that the cluster CL that is the process target is the non-compressed cluster (Yes in S23). When the cluster CL that is the process target is other than that, the controller 2 determines that the cluster CL that is the process target is not the non-compressed cluster (No in S23).

Figure 11A:
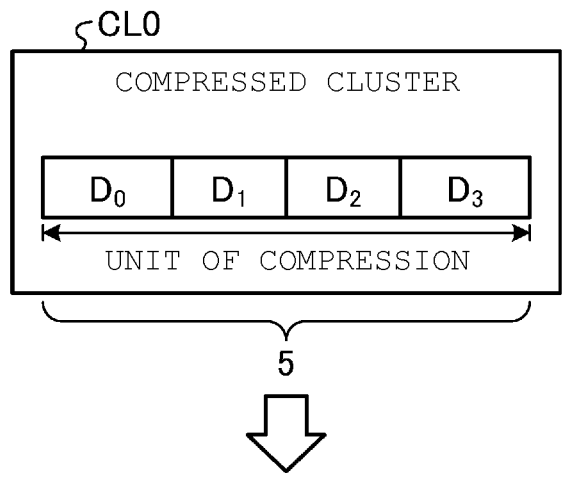
FIGS. 11A to 11C are diagrams illustrating a composite cluster generation/update process in the second embodiment.
Figure 11B:
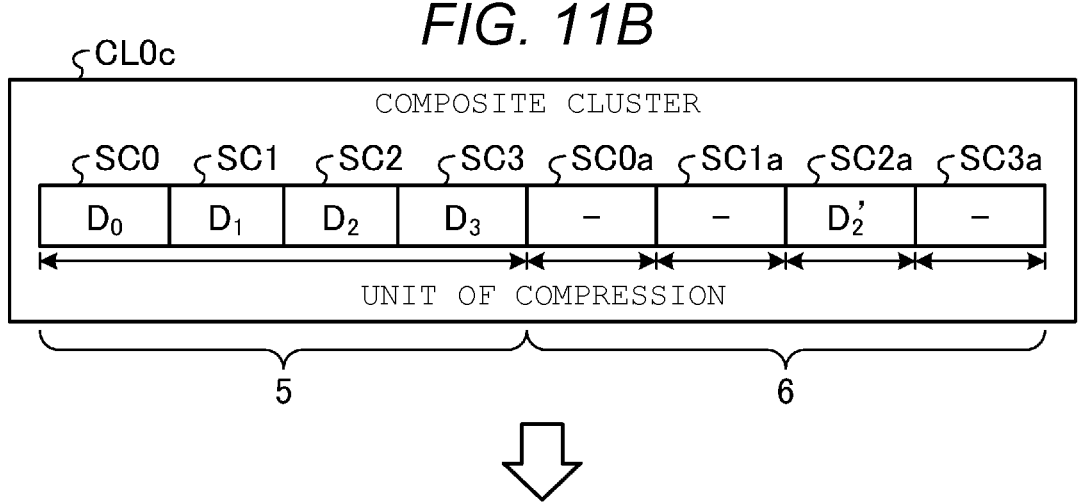
Figure 11C:
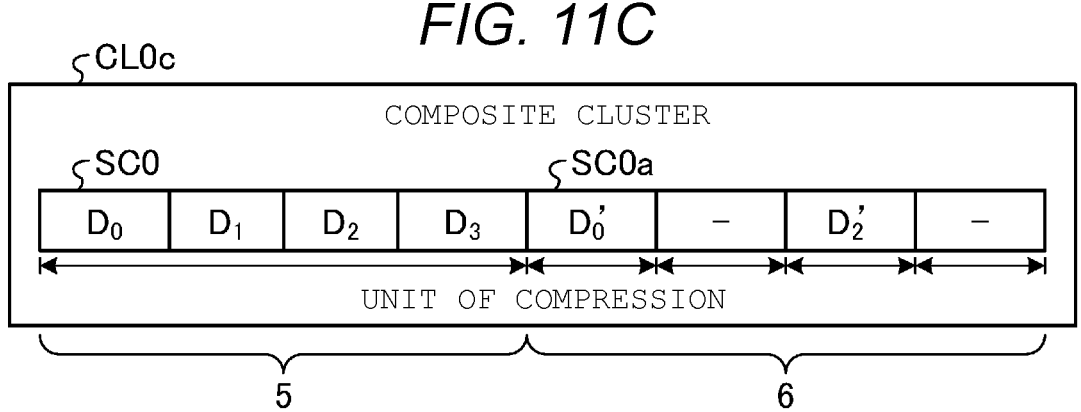

When the cluster CL that is the process target is not the non-compressed cluster (No in S23), the controller 2 packs the original portion 5 and the overwritten portion 6 to generate the composite cluster CLc (S24). The controller 2 may generate a composite cluster CL0c as illustrated in FIGS. 11A to 11C and FIGS. 8A to 8C. FIGS. 11A to 11C are diagrams illustrating an overview of the process for generating the composite cluster CL0c.

FIG. 11A illustrates the compressed cluster CL0. The controller 2 connects (packs) the compressed and encrypted data (overwritten portion 6) to be overwritten to the contents (original portion 5) of the compressed cluster CL0 illustrated in FIG. 11A to generate the composite cluster CL0c illustrated in FIG. 11B. As illustrated in FIGS. 8A to 8C, the packing is performed by adding the header 7 including information grouping the original portion 5 and the overwritten portion 6 into one unit when the original portion 5 and the overwritten portion 6 are written in the physical space. The controller 2 generates the composite cluster CL0a so that the sector SC2a of the overwritten portion 6 instead of the sector SC2, which is a part of the original portion 5, is associated with the LBA. The header 7 added to the original portion 5 and the overwritten portion 6 may include information indicating that the sector SC2a instead of the sector SC2 is associated with the LBA. As illustrated in FIG. 11B, the controller 2 generates the composite cluster CL0c including the original portion 5 in which the plurality of sectors SC0 to SC3 are collectively compressed and encrypted and the overwritten portion 6 in which each of the sectors SC0a to SC3a is compressed and encrypted. No data is written in the sectors SC0a, SC1a, and SC3a in the overwritten portion 6 where no overwrite data exists. After that, the processes of S3 and S4 are performed in the same manner as in the first embodiment.

When the cluster CL that is the process target is the non-compressed cluster (Yes in S23), the controller 2 encrypts the overwrite data without compression. It is noted that, with respect to the overwrite data to be encrypted without compression, the data before compression may also be temporarily stored when the overwrite data is compressed in S21. Alternatively, the overwrite data compressed and encrypted in S21 may be decrypted and decompressed to be acquired. The controller 2 updates the non-compressed cluster with the encrypted overwrite data (without compression) (S25). After that, the processes of S3 and S4 are performed in the same manner as in the first embodiment.

When the cluster CL that is the process target is the composite cluster (Yes in S22), the controller 2 updates the overwritten portion 6 in the composite cluster CLc with the compressed and encrypted overwrite data (S26). The controller 2 may update the composite cluster CL0c as illustrated in FIGS. 11B and 11C. The controller 2 updates the composite cluster CL0c so that the sector SC0a of the overwritten portion 6 instead of the sector SC0, which is a part of the original portion 5, is associated with the LBA. The overwrite data may be written to the sector SC0a of the overwritten portion 6, and the header 7 may be changed so that the sector SC0a instead of the sector SC0 is associated with the LBA.

As described above, in the second embodiment, in the memory system 1, the data in the overwritten portion 6 of the composite cluster is compressed in a smaller unit of compression (for example, a unit of minimum access) than in the original portion 5. Accordingly, it is possible to prevent the data size of the cluster from being increased.

Third Embodiment

Next, a memory system 1 according to a third embodiment will be described. In the following, description will be focused on aspects that differ from those of the first and second embodiments.

In the first embodiment, a case in which the partial overwriting of the original portion 5 is implemented by generating the composite cluster is illustrated. When the partial overwriting of the original portion 5 is repeated, all sectors of the original portion 5 are overwritten. At this time, the composite cluster includes the overwritten portion 6 in which each sector is encrypted without compression in addition to the collectively compressed and encrypted original portion 5.

In the third embodiment, when all the sectors of the original portion 5 are overwritten, the original portion 5 is deleted and the portion corresponding to the overwritten portion 6 is the non-compressed cluster.

As illustrated in FIGS. 12A to 12D and FIGS. 13A to 13D, the controller 2 may generate and update the composite cluster CL0a and may generate the non-compressed cluster. FIGS. 12A to 12D are diagrams illustrating a composite cluster generation/update process and a non-compressed cluster generation process. FIGS. 13A to 13D are diagrams illustrating operations related to the address conversion information LUT and the physical space.

Figure 12A:
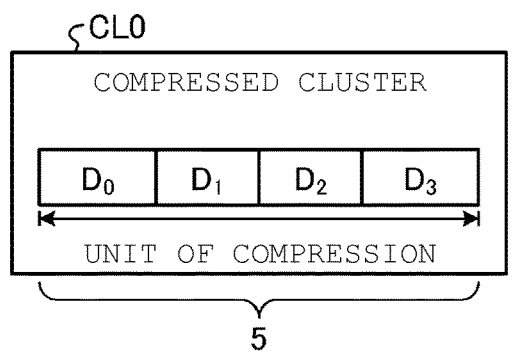
FIGS. 12A to 12D are diagrams illustrating a composite cluster generation/update process and a non-compressed cluster generation process in a third embodiment.

The controller 2 compresses and encrypts the data of LBA=2000 to generate the compressed cluster CL0 illustrated in FIG. 12A. As illustrated in FIG. 13B, the controller 2 writes the compressed cluster CL0 to the physical address MCA=400. As illustrated in FIG. 13A, the controller 2 registers the corresponding relation between LBA=2000 and the physical address MCA=400 in the address conversion information LUT.

Figure 12B:
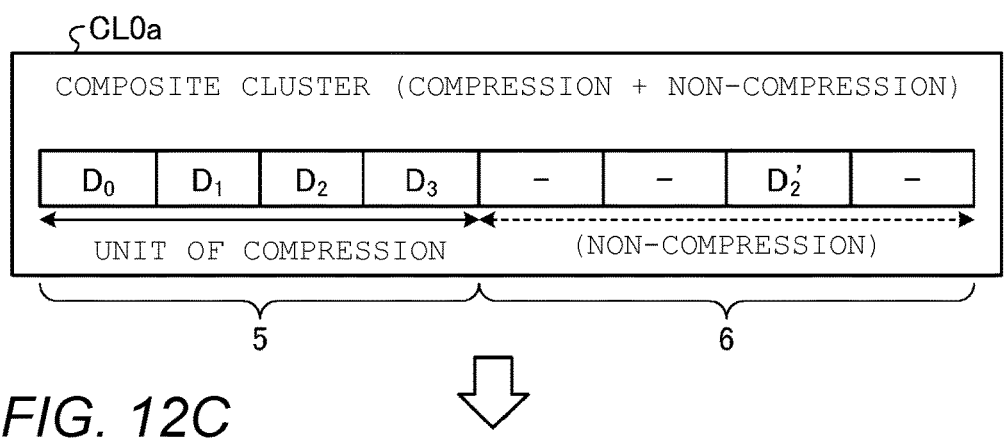

As illustrated in FIG. 12B, the controller 2 packs the original portion 5 and the overwritten portion 6 to generate the composite cluster CL0c in which the sector SC2a instead of the sector SC2 is associated with the LBA. The controller 2 writes the header 7 to the physical address MCA=500. The controller 2 copies the original portion 5 to the physical location in accordance with the physical address MCA=500 (for example, after the header 7). The controller 2 writes the overwritten portion 6 to the physical location (for example, after the original portion 5) in accordance with the physical address MCA=500. Accordingly, the controller 2 updates the address conversion information LUT. In the cases of FIGS. 13B and 13C, in the address conversion information LUT, the corresponding relation between LBA=2000 and the physical address MCA=400 is replaced with the corresponding relation between LBA=2000 and the physical address MCA=500 where the composite cluster CLa is written.

After that, the controller 2 sequentially updates the composite cluster CL0c so that the sectors SC0a, SC1a, and SC3a instead of the sectors SC0, SC1, and SC3 are associated with the LBAs.

Figure 12C:
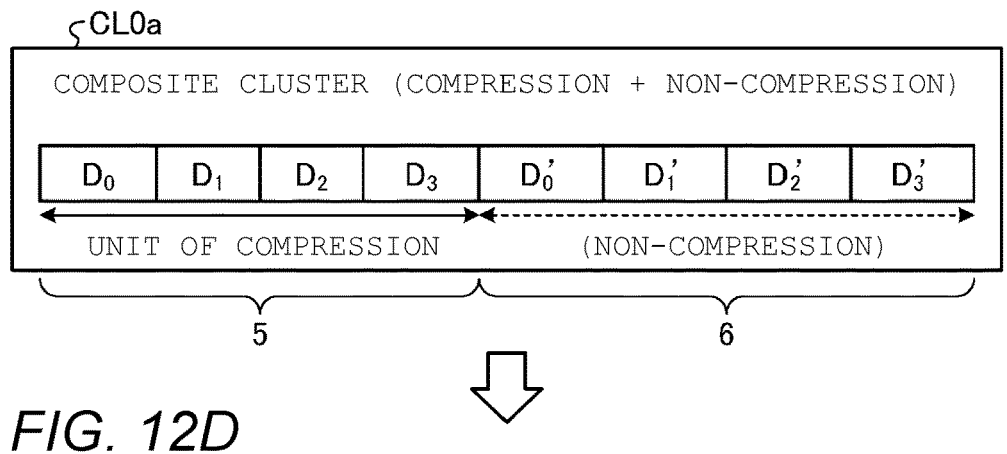

As illustrated in FIG. 12C, when all sectors SC0 to SC3 of the original portion 5 are overwritten, the controller 2 unpacks the original portion 5 and the overwritten portion 6 in the composite cluster CL0a, and the overwritten portion 6 is acquired. In the case of FIG. 13B, the controller 2 reads the composite cluster CL0a from the physical address MCA=500 and temporarily stores the composite cluster CL0a in the buffer memory 4. The controller 2 discards the header 7 and the original portion 5 and acquires the overwritten portion 6. That is, the controller 2 deletes the original portion 5 from the composite cluster CL0a and leaves the overwritten portion 6. The overwritten portion 6 is in the state in which the sectors SC0a to SC3a are encrypted without compression.

Figure 12D:
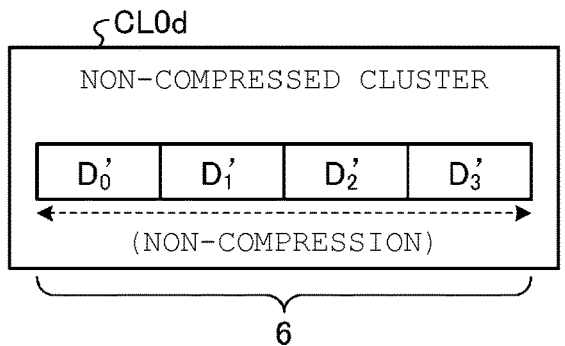

As illustrated in FIG. 12D, the controller 2 writes the overwritten portion 6, in which each sector is encrypted without compression, into the non-volatile memory 3 as a non-compressed cluster CL0d. In the case of FIG. 13B, the controller 2 writes the non-compressed cluster CL0d to the physical address MCA=600. Accordingly, the controller 2 updates the address conversion information LUT. In the cases of FIGS. 13B and 13D, in the address conversion information LUT, the corresponding relation between LBA=2000 and the physical address MCA=500 is replaced with the corresponding relation between LBA=2000 and the physical address MCA=600 where the composite cluster CLa is written.

As described above, in the third embodiment, in the memory system 1, the controller 2 deletes the original portion 5 when all sectors of the original portion 5 in the composite cluster CL0a are overwritten, and the overwritten portion 6 is acquired. The controller 2 writes the acquired overwritten portion 6 as the non-compressed cluster CL0d into the non-volatile memory 3. Accordingly, it is possible to further prevent the data size of the cluster from being increased.

Fourth Embodiment

Next, a memory system 1 according to a fourth embodiment will be described. In the following, description will be focused on aspects that differ from those of the first to third embodiments.

In the second embodiment, the case where partial overwriting of the original portion 5 is implemented by generating the composite clusters is illustrated. When the partial overwriting of the original portion 5 is repeated, all sectors of the original portion 5 are overwritten. At this time, the composite cluster includes the overwritten portion 6 in which each sector is compressed and encrypted in addition to the original portion 5 that is collectively compressed and encrypted.

In the fourth embodiment, when all sectors of the original portion 5 are overwritten, the original portion 5 is deleted, and the portion corresponding to the overwritten portion 6 is a new compressed cluster. The plurality of the sectors of the compressed cluster (original portion 5) are collectively compressed and encrypted, but each sector of the new compressed cluster is compressed and encrypted.

As illustrated in FIGS. 14A to 14D and FIGS. 15A to 15D, the controller 2 may generate and update a composite cluster CL0a and generate a new compressed cluster. FIGS. 14A to 14D are diagrams illustrating a composite cluster generation/update process and a new compressed cluster generation process. FIGS. 15A to 15D are diagrams illustrating operations related to the address conversion information LUT and the physical space.

Figure 14A:
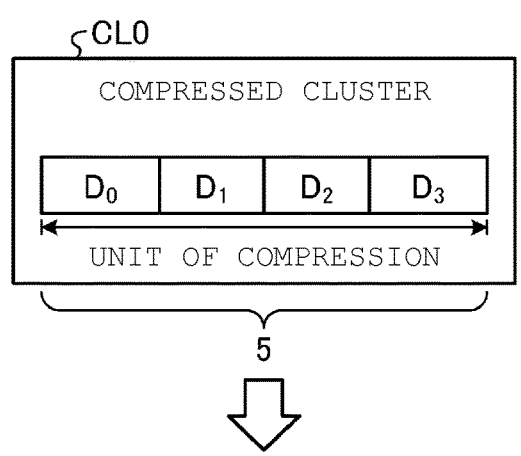
FIGS. 14A to 14D are diagrams illustrating a composite cluster generation/update process in a fourth embodiment.

The controller 2 compresses and encrypts the data of LBA=2000 to generate the compressed cluster CL0 illustrated in FIG. 14A. As illustrated in FIG. 15B, the controller 2 writes the compressed cluster CL0 to the physical address MCA=400. As illustrated in FIG. 14A, the controller 2 registers the corresponding relation between LBA=2000 and the physical address MCA=400 in the address conversion information LUT.

Figure 14B:
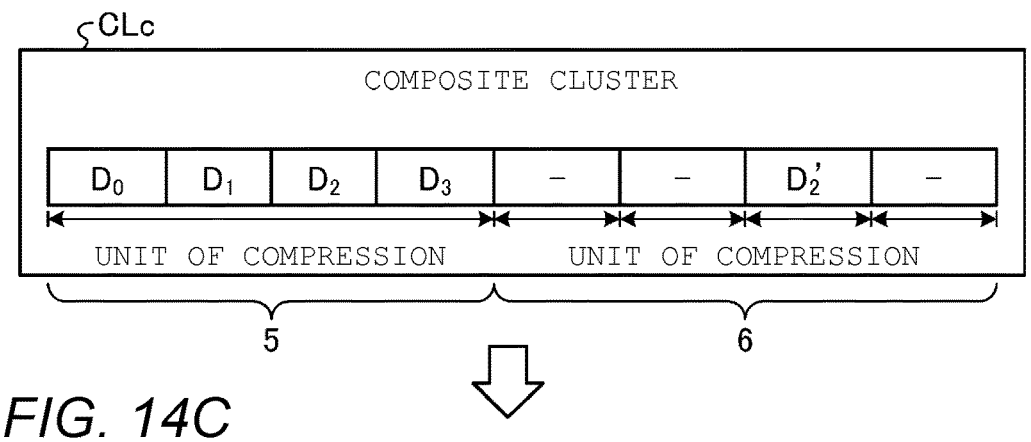

As illustrated in FIG. 14B, the controller 2 packs the original portion 5 and the overwritten portion 6 to generate the composite cluster CL0c in which the sector SC2a instead of the sector SC2 is associated with the LBA. The controller 2 writes the header 7 to the physical address MCA=500. The controller 2 copies the original portion 5 to the physical location (for example, after the header 7) in accordance with the physical address MCA=500. The controller 2 writes the overwritten portion 6 to the physical location (for example, after the original portion 5) in accordance with the physical address MCA=500. Accordingly, the controller 2 updates the address conversion information LUT. In the cases of FIGS. 15B and 15C, in the address conversion information LUT, the corresponding relation between LBA=2000 and the physical address MCA=400 is replaced by the corresponding relation between LBA=2000 and the physical address MCA=500 to which the composite cluster CLa is written.

After that, the controller 2 sequentially updates the composite cluster CL0c so that the sectors SC0a, SC1a, and SC3a instead of the sectors SC0, SC1, and SC3 are associated with the LBAs.

Figure 14C:
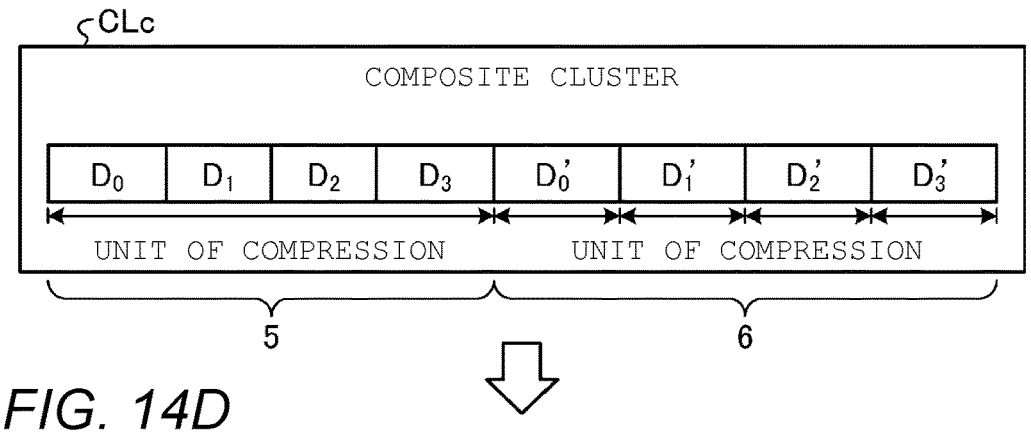

As illustrated in FIG. 14C, when all sectors SC0 to SC3 of the original portion 5 are overwritten, the controller 2 unpacks the original portion 5 and the overwritten portion 6 in the composite cluster CL0c to acquire the overwritten portion 6. In the case of FIG. 15B, the controller 2 reads the composite cluster CL0a from the physical address MCA=500 and temporarily stores the composite cluster CL0a in the buffer memory 4. The controller 2 discards the header 7 and the original portion 5 and acquires the overwritten portion 6. That is, the controller 2 deletes the original portion 5 from the composite cluster CL0a and leaves the overwritten portion 6. The overwritten portion 6 is in the state where the sectors SC0a to SC3a are compressed and encrypted.

Figure 14D:
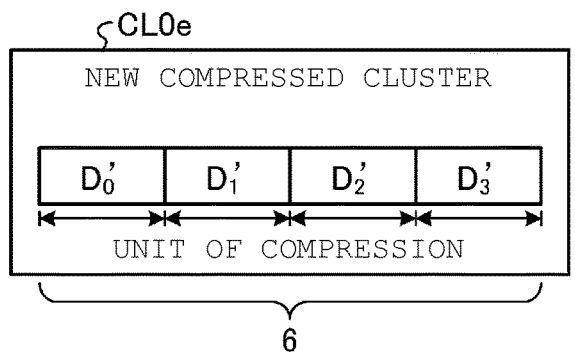

As illustrated in FIG. 14D, the controller 2 writes the overwritten portion 6, in which each sector is compressed and encrypted, into the non-volatile memory 3 as a new compressed cluster CL0e. In the case of FIG. 15B, the controller 2 writes the new compressed cluster CL0e to the physical address MCA=600. Accordingly, the controller 2 updates the address conversion information LUT. In the cases of FIGS. 15B and 15D, in the address conversion information LUT, the corresponding relation between LBA=2000 and the physical address MCA=500 is replaced by the corresponding relation between LBA=2000 and the physical address MCA=600 to which the composite cluster CLa is written.

As described above, in the fourth embodiment, in the memory system 1, the controller 2 deletes the original portion 5 to acquire the overwritten portion 6 according to the situation where all sectors of the original portion 5 in the composite cluster CL0c are overwritten. The controller 2 writes the acquired overwritten portion 6 as a new compressed cluster CL0e into the non-volatile memory 3. Accordingly, it is possible to further prevent the data size of the cluster from being increased.

While certain embodiments have been described, these embodiments have been presented by way of example only, and are not intended to limit the scope of the disclosure. Indeed, the novel embodiments described herein may be embodied in a variety of other forms; furthermore, various omissions, substitutions, and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system comprising:
a non-volatile memory; and
a controller configured to:
perform a write operation of a first data cluster that includes a plurality of data sectors, the write operation including:
compressing and then encrypting the first data cluster, the first data cluster being collectively compressed as a whole; and
writing the compressed and encrypted first data cluster into a first physical location of the non-volatile memory; and
perform a first partial overwrite operation of the first data cluster with first overwrite data that includes a plurality of data sectors, the first partial overwrite operation including:
encrypting the first overwrite data, the first overwrite data being not compressed;
reading the compressed and encrypted first data cluster from the first physical location of the non-volatile memory;
generating a first composite data cluster, the first composite data cluster including an entirety of the compressed and encrypted first data cluster read from the first physical location, the encrypted first overwrite data that is not compressed, and a header that indicates: i) overwrite of at least one data sector of the first data cluster with the first overwrite data; ii) a first data sector of the first data cluster, which is the at least one data sector of the first data cluster, is invalid; and iii) a second data sector of the first overwrite data, which is one of the plurality of data sectors thereof and corresponds to the first data sector of the first data cluster, is valid; and
writing the first composite data cluster into a second physical location of the non-volatile memory, the second physical location being different from the first physical location.

2. The memory system according to claim 1, wherein the header in the first composite data cluster is followed by the compressed and encrypted first data cluster, which is followed by the encrypted first overwrite data.

3. The memory system according to claim 1, wherein the controller is further configured to:
associate a first logical address corresponding to the first data cluster with the first physical location when the write operation is performed; and
dissociate the first physical location from the first logical address and associate the second physical location with the first logical address when the first partial overwrite operation is performed.

4. The memory system according to claim 1, wherein the controller, during the first partial overwrite operation, performs the encryption of the first overwrite data without performing compression and then the reading of the compressed and encrypted first data cluster.

5. The memory system according to claim 4, wherein the controller is configured to perform the first partial overwrite operation in response to a command received from a host, and transmit a response to the command after the encryption of the first overwrite data without performing compression and before the reading of the compressed and encrypted first data cluster.

6. The memory system according to claim 1, wherein the controller is further configured to:
perform a second partial overwrite operation of the first data cluster with second overwrite data, the second partial overwrite operation including:
encrypting the second overwrite data, the second overwrite data being not compressed;
reading the first composite data cluster from the second physical location of the non-volatile memory;
generating a second composite data cluster with the compressed and encrypted first data cluster included in the read first composite data cluster and the encrypted second overwrite data that is not compressed; and
writing the second composite data cluster into a third physical location of the non-volatile memory.

7. The memory system according to claim 6, wherein the controller is further configured to, during the second partial overwrite operation:
determine whether overwrite of the first data cluster with the second overwrite data results in overwrite of the entirety of the first data cluster;
when determining that the overwrite of the first data cluster with the second overwrite data does not result in overwrite of the entirety of the first data cluster, generate the second composite data cluster; and
when determining that the overwrite of the first data cluster with the second overwrite data results in overwrite of the entirety of the first data cluster, generate a third composite data cluster with the second overwrite data and without the first composite data cluster and write the third composite data cluster into the third physical location of the non-volatile memory.

8. The memory system according to claim 6, wherein the controller is further configured to:
associate a first logical address corresponding to the first data cluster with the first physical location when the write operation is performed;
dissociate the first physical location from the first logical address and associate the second physical location with the first logical address when the first partial overwrite operation is performed; and
dissociate the second physical location from the first logical address and associate the third physical location with the first logical address when the second partial overwrite operation is performed.

9. The memory system according to claim 1, wherein the controller is further configured to, during the first partial overwrite operation, determine whether to decrypt the compressed and encrypted first data cluster read from the first physical location of the non-volatile memory based on a required security condition.

10. A memory system comprising:
a non-volatile memory; and
a controller configured to:
perform a write operation of a first data cluster that includes a plurality of data sectors, the write operation including:

compressing and then encrypt the first data cluster, the first data cluster being collectively compressed as a whole; and writing the compressed and encrypted first data cluster into a first physical location of the non-volatile memory; and perform a first partial overwrite operation of the first data cluster with first overwrite data that includes a plurality of data sectors, the first partial overwrite operation including:

encrypting the first overwrite data, the first overwrite data being not compressed;

generating a first overwrite data cluster, the first overwrite data cluster including the encrypted first overwrite data and a header that indicates: i) overwrite of at least one data sector of the first data cluster with the first overwrite data; ii) a first data sector of the first data cluster, which is the at least one data sector of the first data cluster, is invalid; and iii) a second data sector of the first overwrite data, which is one of the plurality of data sectors thereof and corresponds to the first data sector of the first data cluster, is valid; and writing the first overwrite data cluster into a second physical location of the non-volatile memory, the second physical location being different from the first physical location, wherein the compressed and encrypted first data cluster is not read from the first physical location of the non-volatile memory during the first partial overwrite operation, and the first overwrite data does not include the compressed and encrypted first data cluster.

11. The memory system according to claim 10, wherein the controller is further configured to:

associate a first logical address corresponding to the first data cluster with the first physical location when the write operation is performed; and further associate the second physical location with the first logical address when the first partial overwrite operation is performed.

12. A memory system comprising:

a non-volatile memory; and a controller configured to:

perform a write operation of a first data cluster that includes a plurality of data sectors, the write operation including:

compressing and then encrypting the first data cluster; and writing the compressed and encrypted first data cluster into a first physical location of the non-volatile memory; and perform a first partial overwrite operation of the first data cluster with first overwrite data that includes a plurality of data sectors, the first partial overwrite operation including:

compressing and then encrypting the first overwrite data, the first data cluster being collectively compressed as a whole;

reading the compressed and encrypted first data cluster from the first physical location of the non-volatile memory;

generating a first composite data cluster, the first composite data cluster including an entirety of the compressed and encrypted first data cluster read from the first physical location, the compressed and encrypted first overwrite data, and a header that indicates: i) overwrite of at least one data sector of the first data cluster with the first overwrite data; ii) a data sector of the first data cluster, which is the at least one data sector of the first data cluster, is invalid; and iii) a second data sector of the first overwrite data, which is one of the plurality of data sectors thereof and corresponds to the first data sector of the first data cluster, is valid; and writing the first composite data cluster into a second physical location of the non-volatile memory, the second physical location being different from the first physical location, wherein a unit data size of compression of the first overwrite data is less than a unit data size of compression of the first data cluster.

13. The memory system according to claim 12, wherein the header in the first composite data cluster is followed by the compressed and encrypted first data cluster, which is followed by the compressed and encrypted first overwrite data.

14. The memory system according to claim 12, wherein the controller is further configured to:

associate a first logical address corresponding to the first data cluster with the first physical location when the write operation is performed; and dissociate the first physical location from the first logical address and associate the second physical location with the first logical address when the first partial overwrite operation is performed.

15. The memory system according to claim 12, wherein the controller is further configured to:

perform a second partial overwrite operation of the first data cluster with second overwrite data, the second partial overwrite operation including:

compressing and encrypting the second overwrite data;

reading the first composite data cluster from the second physical location of the non-volatile memory;

generating a second composite data cluster with the compressed and encrypted first data cluster included in the read first composite data cluster and the compressed and encrypted second overwrite data; and writing the second composite data cluster into a third physical location of the non-volatile memory.

16. The memory system according to claim 15, wherein the controller is further configured to, during the second partial overwrite operation:

determine whether overwrite of the first data cluster with the second overwrite data results in overwrite of the entirety of the first data cluster;

when determining that the overwrite of the first data cluster with the second overwrite data does not result in overwrite of the entirety of the first data cluster, generate the second composite data cluster; and when determining that the overwrite of the first data cluster with the second overwrite data results in overwrite of the entirety of the first data cluster, generate a third composite data cluster with the second overwrite data and without the first composite data cluster and write the third composite data cluster into the third physical location of the non-volatile memory.

17. The memory system according to claim 15, wherein the controller is further configured to:

associate a first logical address corresponding to the first data cluster with the first physical location when the write operation is performed;

dissociate the first physical location from the first logical address and associate the second physical location with the first logical address when the first partial overwrite operation is performed; and dissociate the second physical location from the first logical address and associate the third physical location with the first logical address when the second partial overwrite operation is performed.

18. The memory system according to claim 1, wherein the controller is further configured to, during the first partial overwrite operation, determine whether to decrypt the compressed and encrypted first data cluster read from the first physical location of the non-volatile memory based on a required latency.

19. The memory system according to claim 1, wherein
the header consists of a sequence of bits including a first bit at a first location in the sequence and a second bit at a second location in the sequence, the first bit at the first location indicating that the first data sector of the first data cluster is invalid and the second bit at the second location indicating that the second data sector of the first overwrite data is valid, and the header indicates the overwrite of at least one data sector of the first data cluster with the first overwrite data by a number of bits of the sequence.

* * * * *